United States Patent
Edlund et al.

(10) Patent No.: US 9,914,641 B2
(45) Date of Patent: Mar. 13, 2018

(54) HYDROGEN GENERATION ASSEMBLIES

(71) Applicant: Element 1 Corp., Bend, OR (US)

(72) Inventors: David J Edlund, Bend, OR (US); Robert Schluter, Bend, OR (US)

(73) Assignee: Element 1 Corp., Bend, OR (US)

( * ) Notice: Subject to any disclaimer, the term of this patent is extended or adjusted under 35 U.S.C. 154(b) by 169 days.

(21) Appl. No.: 14/961,529

(22) Filed: Dec. 7, 2015

(65) Prior Publication Data

US 2016/0083251 A1   Mar. 24, 2016

Related U.S. Application Data

(63) Continuation of application No. 13/600,096, filed on Aug. 30, 2012, now abandoned.

(51) Int. Cl.
| | | |
|---|---|---|
| *C01B 3/52* | (2006.01) | |
| *C01B 3/32* | (2006.01) | |
| *C01B 3/50* | (2006.01) | |

(52) U.S. Cl.
CPC ............... *C01B 3/32* (2013.01); *C01B 3/501* (2013.01); *C01B 2203/0233* (2013.01); *C01B 2203/0283* (2013.01); *C01B 2203/043* (2013.01); *C01B 2203/044* (2013.01); *C01B 2203/0405* (2013.01); *C01B 2203/047* (2013.01);
(Continued)

(58) Field of Classification Search
CPC ........................ Y02E 60/34; C01B 2203/1685
See application file for complete search history.

(56) References Cited

U.S. PATENT DOCUMENTS 3,154,920 A   11/1964   Nash et al.
3,608,610 A    9/1971   Greatorex et al.
(Continued)

FOREIGN PATENT DOCUMENTS

| CA | 2467012 | 4/2001 |
|---|---|---|
| CN | 1524308 | 8/2004 |
| CN | 1931708 A | 3/2007 |
| CN | 101350411 | 1/2009 |
| DE | 69120740 T2 | 11/1996 |

(Continued)

OTHER PUBLICATIONS

Japan Patent Office, Office Action for Japanese Patent Application No. 2015-529963, dated Jan. 18, 2016, 7 pages.
(Continued)

*Primary Examiner* — Matthew J Merkling
(74) *Attorney, Agent, or Firm* — Kolisch Hartwell, P.C.

(57) ABSTRACT

Hydrogen generation assemblies and methods of generating hydrogen are disclosed. In some embodiments, the method may include receiving a feed stream in a fuel processing assembly of the hydrogen generation assembly; and generating a product hydrogen stream in the fuel processing assembly from the received feed stream. Generating a product hydrogen stream may, in some embodiments, include generating an output stream in a hydrogen generating region from the received feed stream, and generating the product hydrogen stream in a purification region from the output stream. The method may additionally include receiving the generated product hydrogen stream in a buffer tank of the hydrogen generation assembly; and detecting pressure in the buffer tank via a tank sensor assembly. The method may further include stopping generation of the product hydrogen stream in the fuel processing assembly when the detected pressure in the buffer tank is above a predetermined maximum pressure.

6 Claims, 7 Drawing Sheets

(52) U.S. Cl.
CPC .......... C01B 2203/0445 (2013.01); C01B 2203/0811 (2013.01); C01B 2203/1217 (2013.01); C01B 2203/1235 (2013.01); C01B 2203/169 (2013.01); C01B 2203/1633 (2013.01); C01B 2203/1647 (2013.01)

(56) References Cited

U.S. PATENT DOCUMENTS

| | | |
|---|---|---|
| 3,761,386 A | 9/1973 | Smith |
| 3,935,636 A | 2/1976 | Mermelstein |
| 3,984,324 A | 10/1976 | Wang |
| 4,124,478 A | 11/1978 | Tsien et al. |
| 4,319,978 A | 3/1982 | Millman |
| 5,053,195 A | 10/1991 | MacKay |
| 5,139,541 A | 8/1992 | Edlund |
| 5,182,075 A | 1/1993 | Gotoh et al. |
| 5,217,506 A | 6/1993 | Edlund et al. |
| 5,259,870 A | 11/1993 | Edlund |
| 5,266,283 A | 11/1993 | Friesen et al. |
| 5,393,325 A | 2/1995 | Edlund |
| 5,498,278 A | 3/1996 | Edlund |
| 5,536,405 A | 7/1996 | Myrna et al. |
| 5,645,626 A | 7/1997 | Edlund et al. |
| 5,711,882 A | 1/1998 | Hofmann et al. |
| 5,791,308 A | 8/1998 | Carter et al. |
| 5,861,137 A | 1/1999 | Edlund |
| 5,888,273 A | 3/1999 | Buxbaum |
| 5,904,754 A | 3/1999 | Juda et al. |
| 5,964,089 A | 10/1999 | Murphy et al. |
| 5,997,594 A | 12/1999 | Edlund et al. |
| 6,136,222 A | 10/2000 | Friesen et al. |
| 6,152,995 A | 11/2000 | Edlund |
| 6,168,650 B1 | 1/2001 | Buxbaum |
| 6,171,574 B1 | 1/2001 | Juda et al. |
| 6,183,543 B1 | 2/2001 | Buxbaum |
| 6,189,568 B1 | 2/2001 | Bergum et al. |
| 6,221,117 B1 | 4/2001 | Edlund et al. |
| 6,241,945 B1 | 6/2001 | Owen |
| 6,319,306 B1 | 11/2001 | Edlund et al. |
| 6,332,913 B1 | 12/2001 | Breitschwerdt et al. |
| 6,375,906 B1 | 4/2002 | Edlund et al. |
| 6,376,113 B1 | 4/2002 | Edlund et al. |
| 6,383,670 B1 | 5/2002 | Edlund et al. |
| 6,419,728 B1 | 7/2002 | Edlund |
| 6,451,464 B1 | 9/2002 | Edlund et al. |
| 6,458,189 B1 | 10/2002 | Edlund et al. |
| 6,465,118 B1 | 10/2002 | Dickman et al. |
| 6,475,268 B2 | 11/2002 | Thornton |
| 6,494,937 B1 | 12/2002 | Edlund et al. |
| 6,495,277 B1 | 12/2002 | Edlund et al. |
| 6,537,352 B2 | 3/2003 | Edlund et al. |
| 6,547,858 B1 | 4/2003 | Edlund et al. |
| 6,562,111 B2 | 5/2003 | Edlund et al. |
| 6,569,227 B2 | 5/2003 | Edlund et al. |
| 6,596,057 B2 | 7/2003 | Edlund et al. |
| 6,632,270 B2 | 10/2003 | Edlund et al. |
| 6,660,069 B2 | 12/2003 | Sato et al. |
| 6,667,128 B2 | 12/2003 | Edlund |
| 6,719,831 B2 | 4/2004 | Edlund et al. |
| 6,719,832 B2 | 4/2004 | Edlund et al. |
| 6,723,156 B2 | 4/2004 | Edlund et al. |
| 6,767,389 B2 | 7/2004 | Edlund et al. |
| 6,783,741 B2 | 8/2004 | Edlund et al. |
| 6,811,908 B2 | 11/2004 | Edlund et al. |
| 6,818,335 B2 | 11/2004 | Edlund et al. |
| 6,824,593 B2 | 11/2004 | Edlund et al. |
| 6,835,481 B2 | 12/2004 | Dickman et al. |
| 6,858,341 B2 | 2/2005 | Edlund |
| 6,869,707 B2 | 3/2005 | Edlund et al. |
| 6,872,464 B2 | 3/2005 | Hübner et al. |
| 6,878,474 B2 | 4/2005 | Dickman et al. |
| 6,890,672 B2 | 5/2005 | Dickman et al. |
| 6,896,709 B1 | 5/2005 | Han et al. |
| 6,953,497 B2 | 10/2005 | Edlund et al. |
| 6,979,507 B2 | 12/2005 | Edlund et al. |
| 6,994,927 B2 | 2/2006 | Edlund et al. |
| 7,005,113 B2 | 2/2006 | Edlund et al. |
| 7,008,708 B2 | 3/2006 | Edlund et al. |
| 7,029,515 B2 | 4/2006 | Krueger |
| 7,052,530 B2 | 5/2006 | Edlund et al. |
| 7,063,047 B2 | 6/2006 | Reinke et al. |
| 7,101,421 B2 | 9/2006 | Edlund et al. |
| 7,135,048 B1 | 11/2006 | Edlund et al. |
| 7,147,677 B2 | 12/2006 | Edlund |
| 7,182,917 B2 | 2/2007 | Krueger |
| 7,195,663 B2 | 3/2007 | Edlund et al. |
| 7,201,783 B2 | 4/2007 | Edlund |
| 7,208,241 B2 | 4/2007 | Edlund et al. |
| 7,250,231 B2 | 7/2007 | Edlund |
| 7,258,946 B2 | 8/2007 | Edlund |
| 7,297,183 B2 | 11/2007 | Edlund et al. |
| 7,306,868 B2 | 12/2007 | Arthur |
| 7,341,609 B2 | 3/2008 | DeVries |
| 7,368,194 B2 | 5/2008 | Dickman et al. |
| 7,368,195 B2 | 5/2008 | Edlund et al. |
| 7,390,587 B2 | 6/2008 | Dickman et al. |
| 7,410,531 B2 | 8/2008 | Edlund et al. |
| 7,470,293 B2 | 12/2008 | Edlund et al. |
| 7,476,455 B2 | 1/2009 | Edlund |
| 7,485,381 B2 | 2/2009 | Dickman et al. |
| 7,601,302 B2 | 10/2009 | Edlund et al. |
| 7,632,321 B2 | 12/2009 | Edlund |
| 7,632,322 B2 | 12/2009 | Edlund |
| 7,659,019 B2 | 2/2010 | Edlund |
| 7,682,718 B2 | 3/2010 | Dickman et al. |
| 7,736,596 B2 | 6/2010 | Edlund et al. |
| 7,771,882 B2 | 8/2010 | Edlund et al. |
| 7,789,941 B2 | 9/2010 | Edlund et al. |
| 7,819,955 B2 | 10/2010 | Edlund et al. |
| 7,828,864 B2 | 11/2010 | Edlund et al. |
| 7,846,569 B2 | 12/2010 | Edlund et al. |
| 7,939,211 B2 | 5/2011 | Edlund et al. |
| 7,977,000 B2 | 7/2011 | Edlund |
| 7,981,172 B2 | 7/2011 | Edlund et al. |
| 7,985,510 B2 | 7/2011 | Edlund et al. |
| 8,021,446 B2 | 9/2011 | Adams et al. |
| 8,038,748 B2 | 10/2011 | Edlund |
| 8,057,575 B2 | 11/2011 | Edlund et al. |
| 8,133,626 B2 | 3/2012 | Edlund et al. |
| 8,262,752 B2 | 9/2012 | Popham |
| 8,961,627 B2 | 2/2015 | Edlund |
| 2001/0045061 A1 | 11/2001 | Edlund et al. |
| 2002/0071976 A1 | 6/2002 | Edlund |
| 2002/0081235 A1 | 6/2002 | Baldwin et al. |
| 2002/0100518 A1 | 8/2002 | Kuriiwa et al. |
| 2002/0114984 A1 | 8/2002 | Edlund et al. |
| 2003/0015096 A1 | 1/2003 | Sato et al. |
| 2003/0087138 A1 | 5/2003 | Margiott et al. |
| 2003/0091876 A1 | 5/2003 | Rusta-Sellehy et al. |
| 2003/0167690 A1 | 9/2003 | Edlund et al. |
| 2003/0192251 A1 | 10/2003 | Edlund et al. |
| 2003/0223926 A1 | 12/2003 | Edlund et al. |
| 2004/0065013 A1 | 4/2004 | DeVries |
| 2004/0066043 A1 | 4/2004 | Maiwald et al. |
| 2004/0067195 A1 | 4/2004 | Strizki et al. |
| 2004/0081867 A1 | 4/2004 | Edlund |
| 2004/0081868 A1 | 4/2004 | Edlund |
| 2004/0197616 A1 | 10/2004 | Edlund et al. |
| 2004/0200459 A1 | 10/2004 | Bennett et al. |
| 2004/0229090 A1 | 11/2004 | Davis et al. |
| 2005/0000802 A1 | 1/2005 | Hobbs |
| 2005/0132640 A1 | 6/2005 | Kelly et al. |
| 2005/0188616 A1 | 9/2005 | Bizjak et al. |
| 2005/0211480 A1 | 9/2005 | Kejha |
| 2006/0019134 A1 | 1/2006 | Yagi et al. |
| 2006/0037476 A1 | 2/2006 | Edlund et al. |
| 2006/0051638 A1 | 3/2006 | Gross |
| 2006/0083956 A1 | 4/2006 | Ukai et al. |
| 2006/0090397 A1 | 5/2006 | Edlund et al. |
| 2006/0112636 A1 | 6/2006 | Chellappa et al. |
| 2006/0127719 A1 | 6/2006 | Brantley et al. |
| 2006/0144700 A1 | 7/2006 | Carson et al. |
| 2006/0216562 A1 | 9/2006 | Edlund et al. |
| 2006/0225350 A1 | 10/2006 | Spallone et al. |

(56) References Cited

U.S. PATENT DOCUMENTS

| | | |
|---|---|---|
| 2006/0233700 A1 | 10/2006 | Chellappa et al. |
| 2007/0062116 A1 | 3/2007 | Edlund et al. |
| 2007/0183968 A1 | 8/2007 | Healey et al. |
| 2007/0190380 A1 | 8/2007 | DeVries |
| 2007/0266631 A1 | 11/2007 | Pledger et al. |
| 2007/0274904 A1 | 11/2007 | Popham et al. |
| 2007/0292729 A1 | 12/2007 | Brantley et al. |
| 2008/0029389 A1 | 2/2008 | Dreier et al. |
| 2008/0075987 A1 | 3/2008 | Kindler et al. |
| 2008/0085434 A1 | 4/2008 | Arthur |
| 2008/0115669 A1 | 5/2008 | Edlund et al. |
| 2008/0138677 A1 | 6/2008 | Edlund |
| 2008/0138678 A1 | 6/2008 | Hill |
| 2008/0176118 A1 | 7/2008 | Edlund et al. |
| 2008/0187797 A1 | 8/2008 | Edlund |
| 2008/0213638 A1 | 9/2008 | Brantley et al. |
| 2008/0222954 A1 | 9/2008 | Adams et al. |
| 2008/0230039 A1 | 9/2008 | Weiss et al. |
| 2009/0011310 A1 | 1/2009 | Trabold et al. |
| 2010/0055518 A1 | 3/2010 | Chen et al. |
| 2010/0064887 A1 | 3/2010 | Edlund et al. |
| 2010/0167155 A1 | 7/2010 | Kim et al. |
| 2010/0181765 A1 | 7/2010 | More |
| 2010/0230079 A1 | 9/2010 | Byers et al. |
| 2010/0261074 A1 | 10/2010 | Edlund et al. |
| 2011/0137537 A1 | 6/2011 | Leone |
| 2011/0180396 A1 | 7/2011 | Giacomini |
| 2011/0250518 A1 | 10/2011 | Edlund et al. |
| 2011/0256459 A1 | 10/2011 | Edlund |
| 2011/0256491 A1 | 10/2011 | Edlund et al. |
| 2012/0058403 A1 | 3/2012 | Edlund et al. |
| 2013/0011301 A1 | 1/2013 | Edlund |
| 2014/0065020 A1 | 3/2014 | Edlund et al. |

FOREIGN PATENT DOCUMENTS

| | | |
|---|---|---|
| DE | 69219084 T2 | 7/1997 |
| DE | 69730071 T2 | 8/2005 |
| DE | 60035418 T2 | 3/2008 |
| EP | 0570185 A3 | 11/1993 |
| EP | 0652042 A1 | 5/1995 |
| EP | 0718031 A1 | 6/1996 |
| EP | 0470822 B1 | 7/1996 |
| EP | 0546808 B1 | 4/1997 |
| EP | 0783919 A1 | 7/1997 |
| EP | 0957063 | 11/1999 |
| EP | 1010942 A3 | 6/2000 |
| EP | 0800852 B1 | 8/2004 |
| EP | 1272259 B1 | 10/2004 |
| EP | 1516663 A2 | 3/2005 |
| EP | 1135822 B1 | 4/2005 |
| EP | 1279431 B1 | 4/2005 |
| EP | 1523054 A2 | 4/2005 |
| EP | 1557395 | 7/2005 |
| EP | 1679111 A2 | 7/2006 |
| EP | 0951529 B1 | 8/2006 |
| EP | 1252678 B1 | 11/2006 |
| EP | 1189678 B1 | 7/2007 |
| EP | 1290747 B1 | 2/2009 |
| EP | 1138096 B1 | 10/2010 |
| EP | 2359928 A2 | 8/2011 |
| GB | 2355418 A | 4/2001 |
| GB | 2370241 A | 6/2002 |
| JP | 63021204 | 1/1988 |
| JP | 63039622 A | 2/1988 |
| JP | 63126539 A | 5/1988 |
| JP | 63252903 | 10/1988 |
| JP | 64063019 | 3/1989 |
| JP | 6127903 | 5/1994 |
| JP | 10052621 A | 2/1998 |
| JP | 11265833 A | 9/1999 |
| JP | 2001010804 A | 1/2001 |
| JP | 2002346372 A | 12/2002 |
| JP | 2003277019 A | 10/2003 |
| JP | 2003282119 A | 10/2003 |
| JP | 2003530664 A | 10/2003 |
| JP | 2004071242 A | 3/2004 |
| JP | 2005067990 A | 3/2005 |
| JP | 2005154198 | 6/2005 |
| JP | 2006019033 | 1/2006 |
| JP | 2006040597 | 2/2006 |
| JP | 2006503780 A | 2/2006 |
| JP | 2006137668 | 6/2006 |
| JP | 2006523795 A | 10/2006 |
| JP | 2007095548 | 4/2007 |
| JP | 2007099528 A | 4/2007 |
| JP | 2008171815 | 7/2008 |
| JP | 2008528430 | 7/2008 |
| JP | 2008285404 A | 11/2008 |
| JP | 2008308351 | 12/2008 |
| JP | 2009509299 | 3/2009 |
| JP | 2010-013323 A | 1/2010 |
| JP | 2010010050 | 1/2010 |
| JP | 2011-057480 A | 3/2011 |
| JP | 2014520750 | 8/2014 |
| TW | 563270 B | 11/2003 |
| TW | 200404739 A | 4/2004 |
| TW | 200629635 A | 8/2006 |
| TW | 200740014 A | 10/2007 |
| TW | 200804177 A | 1/2008 |
| WO | 8806489 A1 | 9/1988 |
| WO | 9919456 A1 | 4/1999 |
| WO | 0022690 A1 | 4/2000 |
| WO | 0056425 A1 | 9/2000 |
| WO | 0108247 A1 | 2/2001 |
| WO | 0112311 A1 | 2/2001 |
| WO | 0112539 A1 | 2/2001 |
| WO | 0126174 A1 | 4/2001 |
| WO | 0150541 A1 | 7/2001 |
| WO | 0150542 A1 | 7/2001 |
| WO | 0168514 A2 | 9/2001 |
| WO | 0170376 A1 | 9/2001 |
| WO | 0173879 A1 | 10/2001 |
| WO | 0193362 A1 | 12/2001 |
| WO | 0238265 A1 | 5/2002 |
| WO | 0249128 A2 | 6/2002 |
| WO | 02069428 A1 | 9/2002 |
| WO | 03002244 A1 | 1/2003 |
| WO | 03026776 A1 | 4/2003 |
| WO | 03041188 A2 | 5/2003 |
| WO | 03077331 A2 | 9/2003 |
| WO | 03086964 A1 | 10/2003 |
| WO | 03089128 A1 | 10/2003 |
| WO | 03100900 A1 | 12/2003 |
| WO | 2004038845 A1 | 5/2004 |
| WO | 2004091005 A2 | 10/2004 |
| WO | 2005001955 A2 | 1/2005 |
| WO | 2005091785 A2 | 10/2005 |
| WO | 2005119824 A2 | 12/2005 |
| WO | 2006033773 A2 | 3/2006 |
| WO | 2006049918 A2 | 5/2006 |
| WO | 2006050335 A2 | 5/2006 |
| WO | 2006081402 | 8/2006 |
| WO | 2006133003 A2 | 12/2006 |
| WO | 2007035467 A2 | 3/2007 |
| WO | 2007037856 A2 | 4/2007 |
| WO | 2007049130 A1 | 5/2007 |
| WO | 2008008279 A2 | 1/2008 |
| WO | 2008033301 A1 | 3/2008 |
| WO | 2008105770 A1 | 9/2008 |
| WO | 2009088962 A1 | 7/2009 |
| WO | 2010033628 A1 | 3/2010 |
| WO | 2010118221 A1 | 10/2010 |
| WO | 2011059446 A1 | 5/2011 |
| WO | 2012067612 A1 | 5/2012 |
| WO | 2012091121 A1 | 7/2012 |

OTHER PUBLICATIONS

Taiwan Intellectual Property Office, Office Action for Taiwanese Patent Application No. 103108640, dated Nov. 23, 2015, 39 pages.

(56) References Cited

OTHER PUBLICATIONS

The Patent Office of the People's Republic of China, Office Action for Chinese Patent Application No. 201380052485.2, dated Dec. 29, 2016, 16 pages.
Taiwan Intellectual Property Office, Office Action for Taiwan Patent Application No. 103108640, dated Aug. 25, 2016, 27 pages.
Japan Patent Office, Office Action for Japanese Patent Application No. 2015-135010, dated Sep. 7, 2016, 15 pages.
Japan Patent Office, Office Action for Japanese Patent Application No. 2016-500545, dated Sep. 28, 2016, 6 pages.
United States Patent and Trademark Office, Office Action for U.S. Appl. No. 14/594,997, dated Sep. 15, 2016, 85 pages.
The Patent Office of the People's Republic of China, Office Action for Chinese Patent Application No. 201380052485.2, dated Jan. 12, 2016, 16 pages.
Edlund, David, "Methanol Fuel Cell Systems: Advancing Towards Commercialization", Pan Stanford Publishing Pte. Ltd., Singapore, 2011, 199 pages.
HGS-M Series Hydrogen Generator: Powering Fuel Cells from readily available Methanol, www.hy9.com, Hopkinton, Massachusetts, USA, updated Jun. 20, 2011, 2 pages.
U.S. Receiving Office, International Search Report for PCT Application No. PCT/US12/45437, dated Nov. 19, 2012, 6 pages.
U.S. Receiving Office, Written Opinion for PCT Application No. PCT/US12/45437, dated Nov. 19, 2012, 10 pages.
Taiwan Intellectual Property Office, Examination Report in Taiwanese Patent Application No. 101124209, dated Dec. 19, 2013, 32 pages.
U.S. Receiving Office, International Preliminary Report for PCT Application No. PCT/US2012/045437, dated Jan. 7, 2014, 7 pages.
U.S. Receiving Office, International Search Report for PCT Application No. PCT/US13/56908, dated Jan. 24, 2014, 2 pages.
U.S. Receiving Office, Written Opinion for PCT Application No. PCT/US13/56908, dated Jan. 24, 2014, 12 pages.
U.S. Receiving Office, International Search report for PCT Application No. PCT/US2014/019837, dated Jun. 6, 2014, 2 pages.
U.S. Receiving Office, Written Opinion for PCT Application No. PCT/US2014/019837, dated Jun. 6, 2014, 8 pages.
Taiwan Intellectual Property Office, Examination Report for Taiwanese Patent Application No. 102131014, dated Dec. 27, 2014, 29 pages.
State Intellectual Property Office of the P.R.C., Office Action for Chinese Patent Application No. 201280039436.0, dated Jan. 27, 2015, 28 pages.
Japan Patent Office, Office Action for Japanese Patent Application No. 2014-519267, dated Apr. 6, 2015, 13 pages.
Taiwan Intellectual Property Office, Office Action for Taiwanese Patent Application No. 103134184, dated Apr. 30, 2015, 17 pages.
U.S. Patent and Trademark Office, Office Action for U.S. Appl. No. 13/600,096, dated Feb. 5, 2015, 9 pages.
U.S. Patent and Trademark Office, Office Action for U.S. Appl. No. 13/600,096, dated Jun. 1, 2015, 9 pages.
U.S. Patent and Trademark Office, Office Action for U.S. Appl. No. 13/829,766 dated Jun. 26, 2015, 6 pages.
U.S. Patent and Trademark Office, Office Action for U.S. Appl. No. 13/600,096, dated Sep. 11, 2015, 9 pages.
Taiwan Intellectual Property Office, Decision of Rejection for Taiwanese Patent Application No. 102131014, dated Nov. 2, 2015, 20 pages.
European Patent Office, Communication pursuant to Rules 70(2) and 70(a)(2) EPC for European Patent Application No. 14773171.5, dated Mar. 2, 2017, 1 page.
The Patent Office of the People's Republic of China, The Second Office Action for Chinese Patent Application No. 201480015413.5, dated Mar. 9, 2017, 17 pages.
The Patent Office of the People's Republic of China, The First Office Action for Chinese Patent Application No. 201510896209.5, dated Mar. 14, 2017, 6 pages.
State Intellectual Property Office of the P.R.C., Office Action for Chinese Patent Application No. 201480015413.5, dated Jul. 4, 2016, 18 pages.
State Intellectual Property Office of the P.R.C., Office Action for Chinese Patent Application No. 201380052485.2, dated Jul. 20, 2016, 31 pages.
European Patent Office, Extended European Search Report for European Patent Application No. 13832056.9, dated Mar. 18, 2016, 6 pages.
European Patent Office, Supplementary European Search Report for European Patent Application No. 14773171.5, dated Oct. 14, 2016, 7 pages.
European Patent Office, Extended European Search Report for European Patent Application No. 14773171.5, dated Feb. 13, 2017, 13 pages.

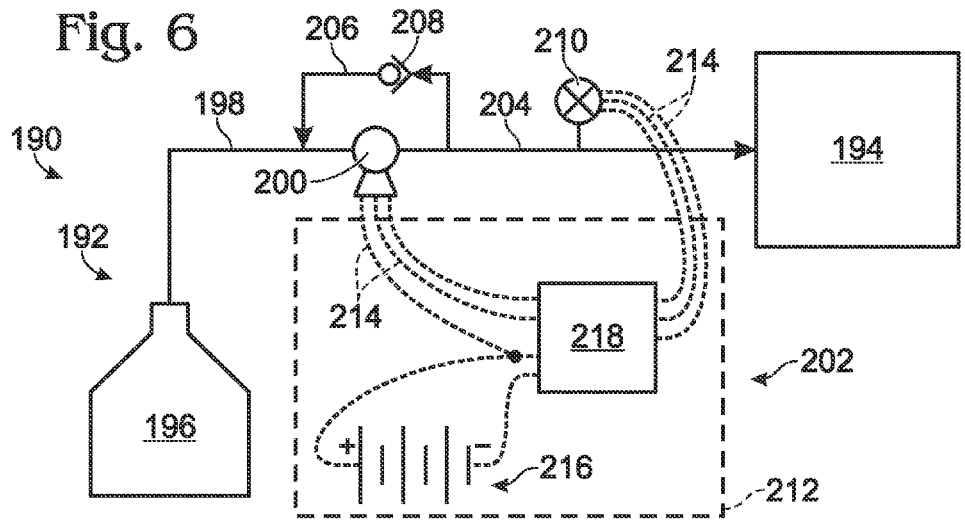
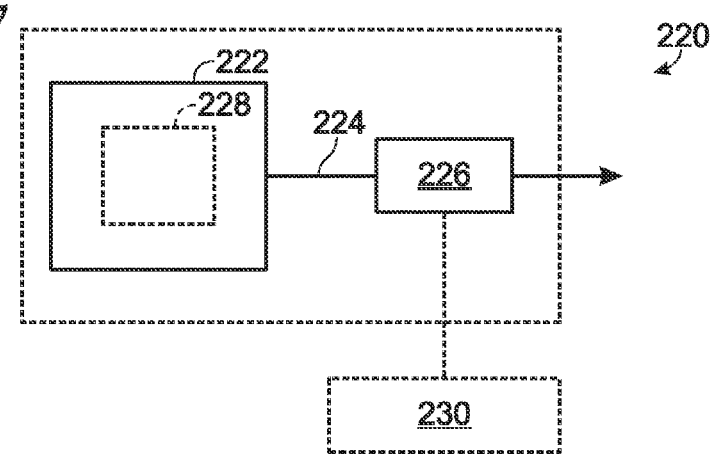
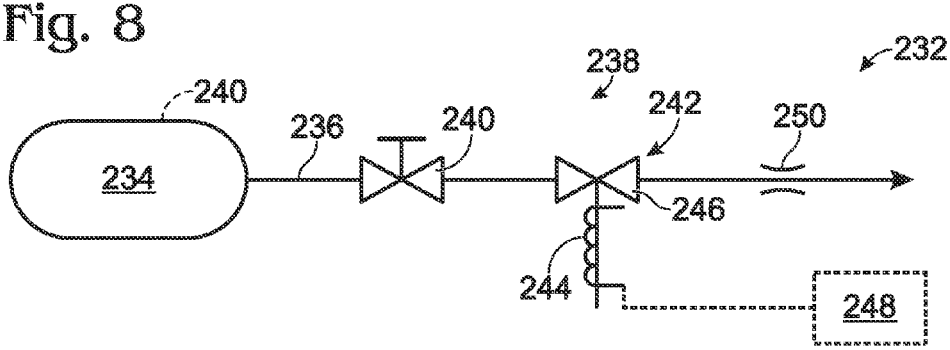

HYDROGEN GENERATION ASSEMBLIES

CROSS-REFERENCE TO RELATED APPLICATIONS

This application is a continuation of U.S. patent application Ser. No. 13/600,096, which was filed Aug. 30, 2012 and entitled HYDROGEN GENERATION ASSEMBLIES. The complete disclosure of the above application is hereby incorporated by reference for all purposes.

BACKGROUND OF THE DISCLOSURE

A hydrogen generation assembly is an assembly that converts one or more feedstocks into a product stream containing hydrogen gas as a majority component. The feedstocks may include a carbon-containing feedstock and, in some embodiments, also may include water. The feedstocks are delivered to a hydrogen-producing region of the hydrogen generation assembly from a feedstock delivery system, typically with the feedstocks being delivered under pressure and at elevated temperatures. The hydrogen-producing region is often associated with a temperature modulating assembly, such as a heating assembly or cooling assembly, which consumes one or more fuel streams to maintain the hydrogen-producing region within a suitable temperature range for effectively producing hydrogen gas. The hydrogen generation assembly may generate hydrogen gas via any suitable mechanism(s), such as steam reforming, autothermal reforming, pyrolysis, and/or catalytic partial oxidation.

The generated or produced hydrogen gas may, however, have impurities. That gas may be referred to as a mixed gas stream that contains hydrogen gas and other gases. Prior to using the mixed gas stream, it must be purified, such as to remove at least a portion of the other gases. The hydrogen generation assembly may therefore include a hydrogen purification device for increasing the hydrogen purity of the mixed gas stream. The hydrogen purification device may include at least one hydrogen-selective membrane to separate the mixed gas stream into a product stream and a byproduct stream. The product stream contains a greater concentration of hydrogen gas and/or a reduced concentration of one or more of the other gases from the mixed gas stream. Hydrogen purification using one or more hydrogen-selective membranes is a pressure driven separation process in which the one or more hydrogen-selective membranes are contained in a pressure vessel. The mixed gas stream contacts the mixed gas surface of the membrane(s), and the product stream is formed from at least a portion of the mixed gas stream that permeates through the membrane(s). The pressure vessel is typically sealed to prevent gases from entering or leaving the pressure vessel except through defined inlet and outlet ports or conduits.

The product stream may be used in a variety of applications. One such application is energy production, such as in electrochemical fuel cells. An electrochemical fuel cell is a device that converts fuel and an oxidant to electricity, a reaction product, and heat. For example, fuel cells may convert hydrogen and oxygen into water and electricity. In those fuel cells, the hydrogen is the fuel, the oxygen is the oxidant, and the water is a reaction product. Fuel cell stacks include a plurality of fuel cells and may be utilized with a hydrogen generation assembly to provide an energy production assembly.

Examples of hydrogen generation assemblies, hydrogen processing assemblies, and/or components of those assemblies are described in U.S. Pat. Nos. 5,861,137; 6,319,306; 6,494,937; 6,562,111; 7,063,047; 7,306,868; 7,470,293; 7,601,302; 7,632,322; U.S. Patent Application Publication Nos. 2006/0090397; 2006/0272212; 2007/0266631; 2007/0274904; 2008/0085434; 2008/0138678; 2008/0230039; 2010/0064887; and U.S. patent application Ser. No. 13/178,098. The complete disclosures of the above patents and patent application publications are hereby incorporated by reference for all purposes.

SUMMARY OF THE DISCLOSURE

Some embodiments may provide a hydrogen generation assembly. In some embodiments, the hydrogen generation assembly may include a fuel processing assembly configured to receive a feed stream and produce a product hydrogen stream from the feed stream. The hydrogen generation assembly may additionally include a feed assembly configured to deliver the feed stream to the fuel processing assembly. The feed assembly may include a feed tank configured to contain feedstock for the feed stream, and a feed conduit fluidly connecting the feed tank and the fuel processing assembly. The feed assembly may additionally include a pump configured to deliver the feed stream at a plurality of flowrates to the fuel processing assembly via the feed conduit. The hydrogen generation assembly may further include a control system. The control system may include a feed sensor assembly configured to detect pressure in the feed conduit downstream from the pump. The control system may additionally include a pump controller configured to select a flowrate from the plurality of flowrates based on the detected pressure in the feed conduit, and to operate the pump at the selected flowrate.

In some embodiments, the hydrogen generation assembly may include a fuel processing assembly configured to receive a feed stream and produce a product hydrogen stream from the feed stream. The hydrogen generation assembly may additionally include a pressurized gas assembly configured to receive at least one container of pressurized gas that is configured to purge the fuel processing assembly. The hydrogen generation assembly may further include a purge conduit configured to fluidly connect the pressurized gas assembly and the fuel processing assembly. The hydrogen generation assembly may additionally include a purge valve assembly configured to allow the at least one pressurized gas to flow through the purge conduit from the pressurized gas assembly to the fuel processing assembly when power to the fuel processing assembly is interrupted.

In some embodiments, the hydrogen generation assembly may include a fuel processing assembly configured to receive a feed stream and to be operable among a plurality of modes, including a run mode in which the fuel processing assembly produces a product hydrogen stream from the feed stream, and a standby mode in which the fuel processing assembly does not produce the product hydrogen stream from the feed stream. The hydrogen generation assembly may additionally include a buffer tank configured to contain the product hydrogen stream, and a product conduit fluidly connecting the fuel processing assembly and the buffer tank. The hydrogen generation assembly may further include a tank sensor assembly configured to detect pressure in the buffer tank, and a control assembly configured to operate the fuel processing assembly between the run and standby modes based, at least in part, on the detected pressure in the buffer tank.

Some embodiments may provide a steam reforming hydrogen generation assembly configured to receive at least one feed stream and generate a reformate stream containing hydrogen gas as a majority component and other gases. In some embodiments, the steam reforming hydrogen generation assembly may include an enclosure having an exhaust port, and a hydrogen-producing region contained within the enclosure and configured to produce, via a steam reforming reaction, the reformate stream from the at least one feed stream. The steam reforming hydrogen generation assembly may additionally include a reformer sensor assembly configured to detect temperature in the hydrogen-producing region. The steam reforming hydrogen generation assembly may further include a heating assembly configured to receive at least one air stream and at least one fuel stream and to combust the at least one fuel stream within a combustion region contained within the enclosure producing a heated exhaust stream for heating at least the hydrogen-producing region to at least a minimum hydrogen-producing temperature. The steam reforming hydrogen generation assembly may additionally include a damper moveably connected to the exhaust port and configured to move among a plurality of positions including a fully open position in which the damper allows the heated exhaust stream to flow through the exhaust port, a closed position in which the damper prevents the heated exhaust stream from flowing through the exhaust port, and a plurality of intermediate open positions between the fully open and closed positions. The steam reforming hydrogen generation assembly may further include a damper controller configured to move the damper between the fully open and closed positions based, at least in part, on the detected temperature in the hydrogen-producing region.

BRIEF DESCRIPTION OF THE DRAWINGS

FIG. 6 is a partial schematic view of a further example of a hydrogen generation assembly.

FIG. 7 is an example of a purge assembly of a hydrogen generation assembly.

FIG. 8 is another example of a purge assembly of a hydrogen generation assembly.

FIG. 17 is a partial schematic view of a further example of a hydrogen generation assembly.

DETAILED DESCRIPTION OF THE DISCLOSURE

Figure 1:
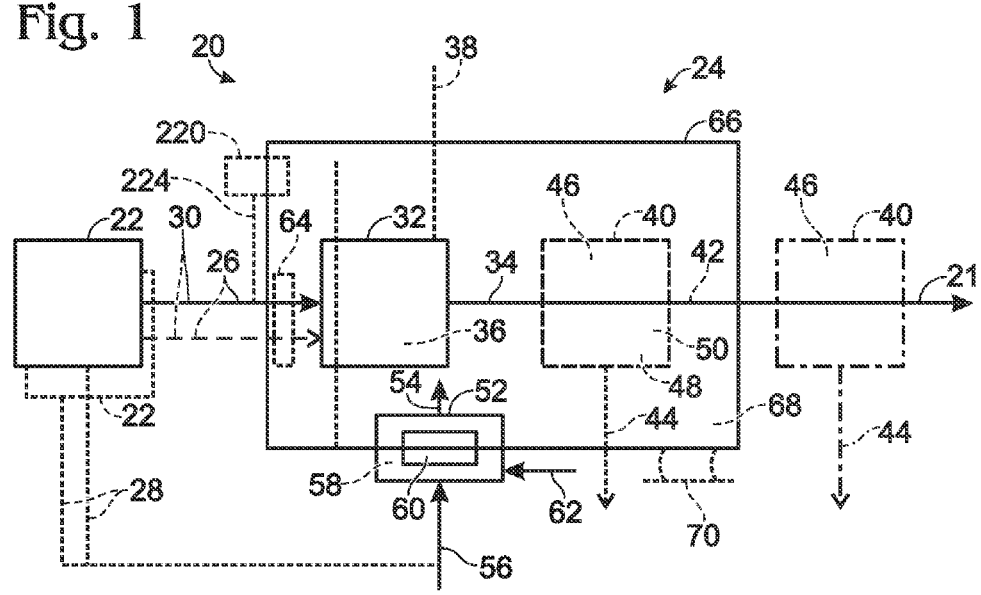
FIG. 1 is a schematic view of an example of a hydrogen generation assembly.

FIG. 1 shows an example of a hydrogen generation assembly 20. Unless specifically excluded hydrogen generation assembly may include one or more components of other hydrogen generation assemblies described in this disclosure. The hydrogen generation assembly may include any suitable structure configured to generate a product hydrogen stream 21. For example, the hydrogen generation assembly may include a feedstock delivery system 22 and a fuel processing assembly 24. The feedstock delivery system may include any suitable structure configured to selectively deliver at least one feed stream 26 to the fuel processing assembly.

In some embodiments, feedstock delivery system 22 may additionally include any suitable structure configured to selectively deliver at least one fuel stream 28 to a burner or other heating assembly of fuel processing assembly 24. In some embodiments, feed stream 26 and fuel stream 28 may be the same stream delivered to different parts of the fuel processing assembly. The feedstock delivery system may include any suitable delivery mechanisms, such as a positive displacement or other suitable pump or mechanism for propelling fluid streams. In some embodiments, feedstock delivery system may be configured to deliver feed stream(s) 26 and/or fuel stream(s) 28 without requiring the use of pumps and/or other electrically powered fluid-delivery mechanisms. Examples of suitable feedstock delivery systems that may be used with hydrogen generation assembly 20 include the feedstock delivery systems described in U.S. Pat. Nos. 7,470,293 and 7,601,302, and U.S. Patent Application Publication No. 2006/0090397. The complete disclosures of the above patents and patent application are hereby incorporated by reference for all purposes.

Feed stream 26 may include at least one hydrogen-production fluid 30, which may include one or more fluids that may be utilized as reactants to produce product hydrogen stream 21. For example, the hydrogen-production fluid may include a carbon-containing feedstock, such as at least one hydrocarbon and/or alcohol. Examples of suitable hydrocarbons include methane, propane, natural gas, diesel, kerosene, gasoline, etc. Examples of suitable alcohols include methanol, ethanol, polyols (such as ethylene glycol and propylene glycol), etc. Additionally, hydrogen-production fluid 30 may include water, such as when fuel processing assembly generates the product hydrogen stream via steam reforming and/or autothermal reforming. When fuel processing assembly 24 generates the product hydrogen stream via pyrolysis or catalytic partial oxidation, feed stream 26 does not contain water.

In some embodiments, feedstock delivery system 22 may be configured to deliver a hydrogen-production fluid 30 that contains a mixture of water and a carbon-containing feedstock that is miscible with water (such as methanol and/or another water-soluble alcohol). The ratio of water to carbon-containing feedstock in such a fluid stream may vary according to one or more factors, such as the particular carbon-containing feedstock being used, user preferences, design of the fuel processing assembly, mechanism(s) used by the fuel processing assembly to generate the product hydrogen stream etc. For example, the molar ratio of water to carbon may be approximately 1:1 to 3:1. Additionally, mixtures of water and methanol may be delivered at or near a 0:1 molar ratio (37 weight % water, 63 weight % methanol), while mixtures of hydrocarbons or other alcohols may be delivered at a water-to-carbon molar ratio greater than 1:1.

When fuel processing assembly 24 generates product hydrogen stream 21 via reforming, feed stream 26 may include, for example, approximately 25-75 volume % methanol or ethanol (or another suitable water-miscible carbon-containing feedstock) and approximately 25-75 volume % water. For feed streams that at least substantially include methanol and water, those streams may include approximately 50-75 volume methanol and approximately 25-50 volume % water. Streams containing ethanol or other water-miscible alcohols may contain approximately 25-60 volume % alcohol and approximately 40-75 volume % water. An example of a feed stream for hydrogen generating assembly 20 that utilizes steam reforming or autothermal reforming contains 69 volume % methanol and 31 volume % water.

Although feedstock delivery system 22 is shown to be configured to deliver a single feed stream 26, the feedstock delivery system may be configured to deliver two or more feed streams 26. Those streams may contain the same or different feedstocks and may have different compositions, at least one common component, no common components, or the same compositions. For example, a first feed stream may include a first component, such as a carbon-containing feedstock and a second feed stream may include a second component, such as water. Additionally, although feedstock delivery system 22 may, in some embodiments, be configured to deliver a single fuel stream 28, the feedstock delivery system may be configured to deliver two or more fuel streams. The fuel streams may have different compositions, at least one common component, no common components, or the same compositions. Moreover, the feed and fuel streams may be discharged from the feedstock delivery system in different phases. For example, one of the streams may be a liquid stream while the other is a gas stream. In some embodiments, both of the streams may be liquid streams, while in other embodiments both of the streams may be gas streams. Furthermore, although hydrogen generation assembly 20 is shown to include a single feedstock delivery system 22, the hydrogen generation assembly may include two or more feedstock delivery systems 22.

Fuel processing assembly 24 may include a hydrogen-producing region 32 configured to produce an output stream 34 containing hydrogen gas via any suitable hydrogen-producing mechanism(s). The output stream may include hydrogen gas as at least a majority component and may include additional gaseous component(s). Output stream 34 may therefore be referred to as a "mixed gas stream" that contains hydrogen gas as its majority component but which includes other gases.

Hydrogen-producing region 32 may include any suitable catalyst-containing bed or region. When the hydrogen-producing mechanism is steam reforming, the hydrogen-producing region may include a suitable steam reforming catalyst 36 to facilitate production of output stream(s) 34 from feed stream(s) 26 containing a carbon-containing feedstock and water. In such an embodiment, fuel processing assembly 24 may be referred to as a "steam reformer," hydrogen-producing region 32 may be referred to as a "reforming region," and output stream 34 may be referred to as a "reformate stream." The other gases that may be present in the reformate stream may include carbon monoxide, carbon dioxide, methane, steam, and/or unreacted carbon-containing feedstock.

When the hydrogen-producing mechanism is autothermal reforming, hydrogen-producing region 32 may include a suitable autothermal reforming catalyst to facilitate the production of output stream(s) 34 from feed stream(s) 26 containing water and a carbon-containing feedstock in the presence of air. Additionally, fuel processing assembly 24 may include an air delivery assembly 38 configured to deliver air stream(s) to the hydrogen-producing region.

In some embodiments, fuel processing assembly 24 may include a purification (or separation) region 40, which may include any suitable structure configured to produce at least one hydrogen-rich stream 42 from output (or mixed gas) stream 34. Hydrogen-rich stream 42 may include a greater hydrogen concentration than output stream 34 and/or a reduced concentration of one or more other gases (or impurities) that were present in that output stream. Product hydrogen stream 21 includes at least a portion of hydrogen-rich stream 42. Thus, product hydrogen stream 21 and hydrogen-rich stream 42 may be the same stream and have the same composition and flow rates. Alternatively, some of the purified hydrogen gas in hydrogen-rich stream 42 may be stored for later use, such as in a suitable hydrogen storage assembly and/or consumed by the fuel processing assembly. Purification region 40 also may be referred to as a "hydrogen purification device" or a "hydrogen processing assembly."

In some embodiments, purification region 40 may produce at least one byproduct stream 44, which may contain no hydrogen gas or some hydrogen gas. The byproduct stream may be exhausted, sent to a burner assembly and/or other combustion source, used as a heated fluid stream, stored for later use, and/or otherwise utilized, stored, and/or disposed. Additionally, purification region 40 may emit the byproduct stream as a continuous stream responsive to the deliver of output stream 34, or may emit that stream intermittently, such as in a batch process or when the byproduct portion of the output stream is retained at least temporarily in the purification region.

Fuel processing assembly 24 may include one or more purification regions configured to produce one or more byproduct streams containing sufficient amounts of hydrogen gas to be suitable for use as a fuel stream (or a feedstock stream) for a heating assembly for the fuel processing assembly. In some embodiments, the byproduct stream may have sufficient fuel value or hydrogen content to enable a heating assembly to maintain the hydrogen-producing region at a desired operating temperature or within a selected range of temperatures. For example, the byproduct stream may include hydrogen gas, such as 10-30 weight % hydrogen gas, 15-25 weight % hydrogen gas, 20-30 weight % hydrogen gas, at least 10 or 15 weight % hydrogen gas, at least 20 weight % hydrogen gas, etc.

Purification region 40 may include any suitable structure configured to reduce the concentration of at least one component of output stream 21. In most applications, hydrogen-rich stream 42 will have a greater hydrogen concentration than output stream (or mixed gas stream) 34. The hydrogen-rich stream also may have a reduced concentration of one or more non-hydrogen components that were present in output stream 34 with the hydrogen concentration of the hydrogen-rich stream being more, the same, or less than the output stream. For example, in conventional fuel cell systems, carbon monoxide may damage a fuel cell stack if it is present in even a few parts per million, while other non-hydrogen components that may be present in output stream 34, such as water, will not damage the stack even if present in much greater concentrations. Therefore, in such an application, the purification region may not increase the overall hydrogen concentration but will reduce the concentration of one or more non-hydrogen components that are harmful, or potentially harmful, to the desired application for the product hydrogen stream.

Examples of suitable devices for purification region 40 include one or more hydrogen-selective membranes 46, chemical carbon monoxide removal assemblies 48, and/or pressure swing adsorption (PSA) systems 50. Purification region 40 may include more than one type of purification device and the devices may have the same or different structures and/or operate by the same or difference mechanism(s). Fuel processing assembly 24 may include at least one restrictive orifice and/or other flow restrictor downstream of the purification region(s), such as associated with one or more product hydrogen stream(s), hydrogen-rich stream(s), and/or byproduct stream(s).

Hydrogen-selective membranes 46 are permeable to hydrogen gas, but are at least substantially (if not completely) impermeable to other components of output stream 34. Membranes 46 may be formed of any hydrogen-permeable material suitable for use in the operating environment and parameters in which purification region 40 is operated. Examples of suitable materials for membranes 46 include palladium and palladium alloys, and especially thin films of such metals and metal alloys. Palladium alloys have proven particularly effective, especially palladium with 35 weight % to 45 weight % copper. A palladium-copper alloy that contains approximately 40 weight % copper has proven particularly effective, although other relative concentrations and components may be used. Another especially effective alloy is palladium with 2 weight % to 10 weight % gold, especially palladium with 5 weight % gold. When palladium and palladium alloys are used, hydrogen-selective membranes 46 may sometimes be referred to as "foils."

Chemical carbon monoxide removal assemblies 48 are devices that chemically react carbon monoxide and/or other undesirable components of output stream 34 to form other compositions that are not as potentially harmful. Examples of chemical carbon monoxide removal assemblies include water-gas shift reactors that are configured to produce hydrogen gas and carbon dioxide from water and carbon monoxide, partial oxidation reactors that are configured to convert carbon monoxide and oxygen (usually from air) into carbon dioxide, and methanation reactors that are configured to convert carbon monoxide and hydrogen to methane and water. Fuel processing assembly 24 may include more than one type and/or number of chemical removal assemblies 48.

Pressure swing adsorption (PSA) is a chemical process in which gaseous impurities are removed from output stream 34 based on the principle that certain gases, under the proper conditions of temperature and pressure, will be adsorbed onto an adsorbent material more strongly than other gases. Typically, the non-hydrogen impurities are adsorbed and removed from output stream 34. Adsorption of impurity gases occurs at elevated pressure. When the pressure is reduced, the impurities are desorbed from the adsorbent material, thus regenerating the adsorbent material. Typically, PSA is a cyclic process and requires at least two beds for continuous (as opposed to batch) operation. Examples of suitable adsorbent materials that may be used in adsorbent beds are activated carbon and zeolites. PSA system 50 also provides an example of a device for use in purification region 40 in which the byproducts, or removed components, are not directly exhausted from the region as a gas stream concurrently with the purification of the output stream. Instead, these byproduct components are removed when the adsorbent material is regenerated or otherwise removed from the purification region.

In FIG. 1, purification region 40 is shown within fuel processing assembly 24. The purification region may alternatively be separately located downstream from the fuel processing assembly, as is schematically illustrated in dash-dot lines in FIG. 1. Purification region 40 also may include portions within and external to the fuel processing assembly.

Fuel processing assembly 24 also may include a temperature modulating assembly in the form of a heating assembly 52. The heating assembly may be configured to produce at least one heated exhaust stream (or combustion stream) 54 from at least one heating fuel stream 28, typically as combusted in the presence of air. Heated exhaust stream 54 is schematically illustrated in FIG. 1 as heating hydrogen-producing region 32. Heating assembly 52 may include any suitable structure configured to generate the heated exhaust stream, such as a burner or combustion catalyst in which a fuel is combusted with air to produce the heated exhaust stream. The heating assembly may include an ignitor or ignition source 58 that is configured to initiate the combustion of fuel. Examples of suitable ignition sources include one or more spark plugs, glow plugs, combustion catalyst, pilot lights, piezoelectric ignitors, spark igniters, hot surface igniters, etc.

In some embodiments, heating assembly 52 may include a burner assembly 60 and may be referred to as a combustion-based, or combustion-driven, heating assembly. In a combustion-based heating assembly, heating assembly 52 may be configured to receive at least one fuel stream 28 and to combust the fuel stream in the presence of air to provide a hot combustion stream 54 that may be used to heat at least the hydrogen-producing region of the fuel processing assembly. Air may be delivered to the heating assembly via a variety of mechanisms. For example, an air stream 62 may be delivered to the heating assembly as a separate stream, as shown in FIG. 1. Alternatively, or additionally, air stream 62 may be delivered to the heating assembly with at least one of the fuel streams 28 for heating assembly 52 and/or drawn from the environment within which the heating assembly is utilized.

Combustion stream 54 may additionally, or alternatively, be used to heat other portions of the fuel processing assembly and/or fuel cell systems with which the heating assembly is used. Additionally, other configuration and types of heating assemblies 52 may be used. For example, heating assembly 52 may be an electrically powered heating assembly that is configured to heat at least hydrogen-producing region 32 of fuel processing assembly 24 by generating heat using at least one heating element, such as a resistive heating element. In those embodiments, heating assembly 52 may not receive and combust a combustible fuel stream to heat the hydrogen-producing region to a suitable hydrogen-producing temperature. Examples of heating assemblies are disclosed in U.S. Pat. No. 7,632,322, the complete disclosure of which is hereby incorporated by reference for all purposes.

Heating assembly 52 may be housed in a common shell or housing with the hydrogen-producing region and/or separation region (as further discussed below). The heating assembly may be separately positioned relative to hydrogen-producing region 32 but in thermal and/or fluid communication with that region to provide the desired heating of at least the hydrogen-producing region. Heating assembly 52 may be located partially or completely within the common shell, and/or at least a portion (or all) of the heating assembly may be located external that shell. When the heating assembly is located external the shell, the hot combustion gases from burner assembly 60 may be delivered via suitable heat transfer conduits to one or more components within the shell.

The heating assembly also may be configured to heat feedstock delivery system 22, the feedstock supply streams, hydrogen-producing region 32, purification (or separation) region 40, or any suitable combination of those systems, streams, and regions. Heating of the feedstock supply streams may include vaporizing liquid reactant streams or components of the hydrogen-production fluid used to produce hydrogen gas in the hydrogen-producing region. In that embodiment, fuel processing assembly 24 may be described as including a vaporization region 64. The heating assembly may additionally be configured to heat other components of the hydrogen generation assembly. For example, the heated exhaust stream may be configured to heat a pressure vessel and/or other canister containing the heating fuel and/or the hydrogen-production fluid that forms at least portions of feed stream 26 and fuel stream 28.

Heating assembly 52 may achieve and/or maintain in hydrogen-producing region 32 any suitable temperatures. Steam reformers typically operate at temperatures in the range of 200° C. and 900° C. However, temperatures outside this range are within the scope of this disclosure. When the carbon-containing feedstock is methanol, the steam reforming reaction will typically operate in a temperature range of approximately 200-500° C. Example subsets of that range include 350-450° C., 375-425° C., and 375-400° C. When the carbon-containing feedstock is a hydrocarbon, ethanol or another alcohol, a temperature range of approximately 400-900° C. will typically be used for the steam reforming reaction. Example subsets of that range include 750-850° C., 725-825° C., 650-750° C., 700-800° C., 700-900° C., 500-800° C., 400-600° C., and 600-800° C. Hydrogen-producing region 32 may include two or more zones, or portions, each of which may be operated at the same or at different temperatures. For example, when the hydrogen-production fluid includes a hydrocarbon, hydrogen-producing region 32 may include two different hydrogen-producing portions, or regions, with one operating at a lower temperature than the other to provide a pre-reforming region. In those embodiments, the fuel processing assembly may also be referred to as including two or more hydrogen-producing regions.

Fuel stream 28 may include any combustible liquid(s) and/or gas(es) that are suitable for being consumed by heating assembly 52 to provide the desired heat output. Some fuel streams may be gases when delivered and combusted by heating assembly 52, while others may be delivered to the heating assembly as a liquid stream. Examples of suitable heating fuels for fuel streams 28 include carbon-containing feedstocks, such as methanol, methane, ethane, ethanol, ethylene, propane, propylene, butane, etc. Additional examples include low molecular weight condensable fuels, such as liquefied petroleum gas, ammonia, lightweight amines, dimethyl ether, and low molecular weight hydrocarbons. Yet other examples include hydrogen and carbon monoxide. In embodiments of hydrogen generation assembly 20 that include a temperature modulating assembly in the form of a cooling assembly instead of a heating assembly (such as may be used when an exothermic hydrogen-generating process—e.g., partial oxidation—is utilized instead of an endothermic process such as steam reforming), the feedstock delivery system may be configured to supply a fuel or coolant stream to the assembly. Any suitable fuel or coolant fluid may be used.

Fuel processing assembly 24 may additionally include a shell or housing 66 in which at least hydrogen-producing region 32 is contained, as shown in FIG. 1. In some embodiments, vaporization region 64 and/or purification region 40 may additionally be contained within the shell. Shell 66 may enable components of the steam reformer or other fuel processing mechanism to be moved as a unit. The shell also may protect components of the fuel processing assembly from damage by providing a protective enclosure and/or may reduce the heating demand of the fuel processing assembly because components may be heated as a unit. Shell 66 may include insulating material 68, such as a solid insulating material, blanket insulating material, and/or an air-filled cavity. The insulating material may be internal the shell, external the shell, or both. When the insulating material is external a shell, fuel processing assembly 24 may further include an outer cover or jacket 70 external the insulation, as schematically illustrated in FIG. 1. The fuel processing assembly may include a different shell that includes additional components of the fuel processing assembly, such as feedstock delivery system 22 and/or other components.

One or more components of fuel processing assembly 24 may either extend beyond the shell or be located external the shell. For example, purification region 40 may be located external shell 66, such as being spaced-away from the shell but in fluid communication by suitable fluid-transfer conduits. As another example, a portion of hydrogen-producing region 32 (such as portions of one or more reforming catalyst beds) may extend beyond the shell, such as indicated schematically with a dashed line representing an alternative shell configuration in FIG. 1. Examples of suitable hydrogen generation assemblies and its components are disclosed in U.S. Pat. Nos. 5,861,137; 5,997,594; and 6,221,117, the complete disclosures of which are hereby incorporated by reference for all purposes.

Figure 2:
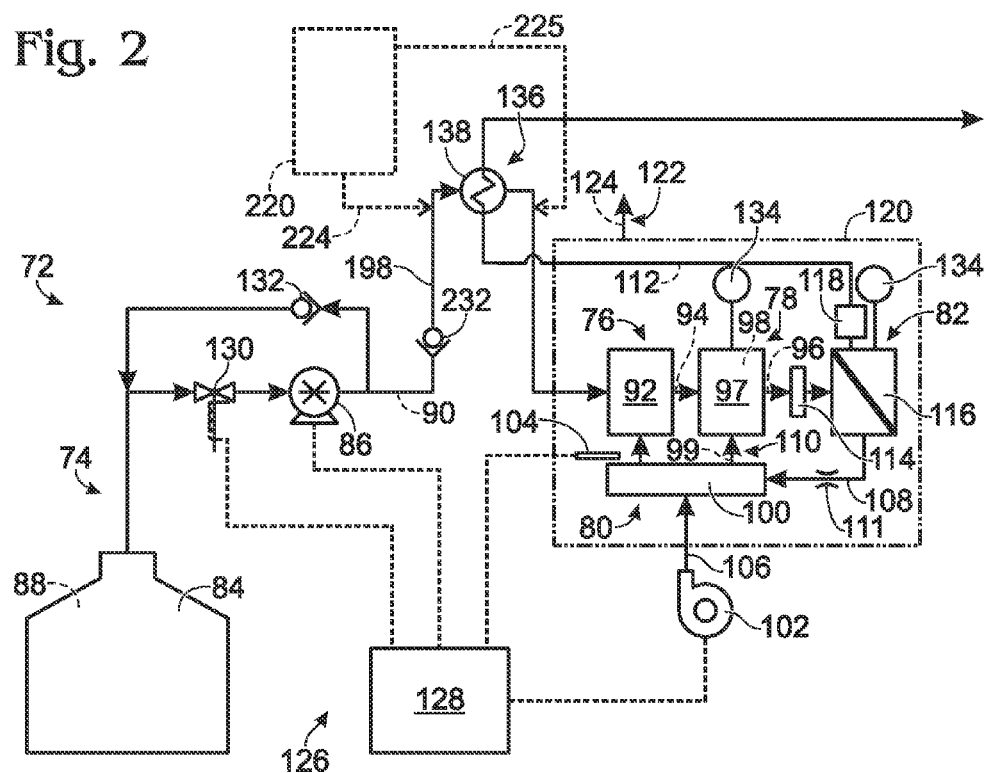
FIG. 2 is a schematic view of another example of a hydrogen generation assembly.

Another example of hydrogen generation assembly 20 is shown in FIG. 2, and is generally indicated at 72. Unless specifically excluded, hydrogen generation assembly 72 may include one or more components of hydrogen generation assembly 20. Hydrogen-generation assembly 72 may include a feedstock delivery system 74, a vaporization region 76, a hydrogen-producing region 78, and a heating assembly 80, as shown in FIG. 2. In some embodiments, hydrogen generation assembly 20 also may include a purification region 82.

The feedstock delivery system may include any suitable structure configured to deliver one or more feed and/or fuel streams to one or more other components of the hydrogen-generation assembly. For example, feedstock delivery system may include a feedstock tank (or container) 84 and a pump 86. The feedstock tank may contain any suitable hydrogen-production fluid 88, such as water and a carbon-containing feedstock (e.g., a methanol/water mixture). Pump 86 may have any suitable structure configured to deliver the hydrogen-production fluid, which may be in the form of at least one liquid-containing feed stream 90 that includes water and a carbon-containing feedstock, to vaporization region 76 and/or hydrogen-producing region 78.

Vaporization region 76 may include any suitable structure configured to receive and vaporize at least a portion of a liquid-containing feed stream, such as liquid-containing feed stream 90. For example, vaporization region 76 may include a vaporizer 92 configured to at least partially transform liquid-containing feed stream 90 into one or more vapor feed streams 94. The vapor feed streams may, in some embodiments, include liquid. An example of a suitable vaporizer is a coiled tube vaporizer, such as a coiled stainless steel tube.

Hydrogen-producing region 78 may include any suitable structure configured to receive one of more feed streams, such as vapor feed stream(s) 94 from the vaporization region, to produce one or more output streams 96 containing hydrogen gas as a majority component and other gases. The hydrogen-producing region may produce the output stream via any suitable mechanism(s). For example, hydrogen-producing region 78 may generate output stream(s) 96 via a steam reforming reaction. In that example, hydrogen-producing region 78 may include a steam reforming region 97 with a reforming catalyst 98 configured to facilitate and/or promote the steam reforming reaction. When hydrogen-producing region 78 generates output stream(s) 96 via a steam reforming reaction, hydrogen generation assembly 72 may be referred to as a "steam reforming hydrogen generation assembly" and output stream 96 may be referred to as a "reformate stream."

Heating assembly 80 may include any suitable structure configured to produce at least one heated exhaust stream 99 for heating one or more other components of the hydrogen generation assembly 72. For example, the heating assembly may heat the vaporization region to any suitable temperature(s), such as at least a minimum vaporization temperature or the temperature in which at least a portion of the liquid-containing feed stream is vaporized to form the vapor feed stream. Additionally, or alternatively, heating assembly 80 may heat the hydrogen-producing region to any suitable temperature(s), such as at least a minimum hydrogen-producing temperature or the temperature in which at least a portion of the vapor feed stream is reacted to produce hydrogen gas to form the output stream. The heating assembly may be in thermal communication with one or more components of the hydrogen generation assembly, such as the vaporization region and/or hydrogen-producing region.

The heating assembly may include a burner assembly 100, at least one air blower 102, and an igniter assembly 104, as shown in FIG. 2. The burner assembly may include any suitable structure configured to receive at least one air stream 106 and at least one fuel stream 108 and to combust the at least one fuel stream within a combustion region 110 to produce heated exhaust stream 99. The fuel stream may be provided by feedstock delivery system 74 and/or purification region 82. The combustion region may be contained within an enclosure of the hydrogen generation assembly. Air blower 102 may include any suitable structure configured to generate air stream(s) 106. Igniter assembly 104 may include any suitable structure configured to ignite fuel stream(s) 108.

Purification region 82 may include any suitable structure configured to produce at least one hydrogen-rich stream 112, which may include a greater hydrogen concentration than output stream 96 and/or a reduced concentration of one or more other gases (or impurities) that were present in that output stream. The purification region may produce at least one byproduct stream or fuel stream 108, which may be sent to burner assembly 100 and used as a fuel stream for that assembly, as shown in FIG. 2. Purification region 82 may include a flow restricting orifice 111, a filter assembly 114, a membrane assembly 116, and a methanation reactor assembly 118. The filter assembly (such as one or more hot gas filters) may be configured to remove impurities from output stream 96 prior to the hydrogen purification membrane assembly.

Membrane assembly 116 may include any suitable structure configured to receive output or mixed gas stream(s) 96 that contains hydrogen gas and other gases, and to generate permeate or hydrogen-rich stream(s) 112 containing a greater concentration of hydrogen gas and/or a lower concentration of other gases than the mixed gas stream. Membrane assembly 116 may incorporate hydrogen-permeable (or hydrogen-selective) membranes that are planar or tubular, and more than one hydrogen-permeable membrane may be incorporated into membrane assembly 116. The permeate stream(s) may be used for any suitable applications, such as for one or more fuel cells. In some embodiments, the membrane assembly may generate a byproduct or fuel stream 108 that includes at least a substantial portion of the other gases. Methanation reactor assembly 118 may include any suitable structure configured to convert carbon monoxide and hydrogen to methane and water. Although purification region 82 is shown to include flow restricting orifice 111, filter assembly 114, membrane assembly 116, and methanation reactor assembly 118, the purification region may have less than all of those assemblies, and/or may alternatively, or additionally, include one or more other components configured to purify output stream 96. For example, purification region 82 may include only membrane assembly 116.

In some embodiments, hydrogen generation assembly 72 may include a shell or housing 120 which may at least partially contain one or more other components of that assembly. For example, shell 120 may at least partially contain vaporization region 76, hydrogen-producing region 78, heating assembly 80, and/or purification region 82, as shown in FIG. 2. Shell 120 may include one or more exhaust ports 122 configured to discharge at least one combustion exhaust stream 124 produced by heating assembly 80.

Hydrogen generation assembly 72 may, in some embodiments, include a control system 126, which may include any suitable structure configured to control operation of hydrogen generation assembly 72. For example, control assembly 126 may include a control assembly 128, at least one valve 130, at least one pressure relief valve 132, and one or more temperature measurement devices 134. Control assembly 128 may detect temperatures in the hydrogen-producing region and/or purification regions via the temperature measurement device 134, which may include one or more thermocouples and/or other suitable devices. Based on the detected temperatures, the control assembly and/or an operator of the control system may adjust delivery of feed stream 90 to vaporization region 76 and/or hydrogen-producing region 78 via valve(s) 130 and pump(s) 86. Valve(s) 130 may include a solenoid valve and/or any suitable valve(s). Pressure relief valve(s) 132 may be configured to ensure that excess pressure in the system is relieved.

In some embodiments, hydrogen generation assembly 72 may include a heat exchange assembly 136, which may include one or more heat exchangers 138 configured to transfer heat from one portion of the hydrogen generation assembly to another portion. For example, heat exchange assembly 136 may transfer heat from hydrogen-rich stream 112 to feed stream 90 to raise the temperature of the feed stream prior to entering vaporization region 76, as well as to cool hydrogen-rich stream 112.

Figure 3:
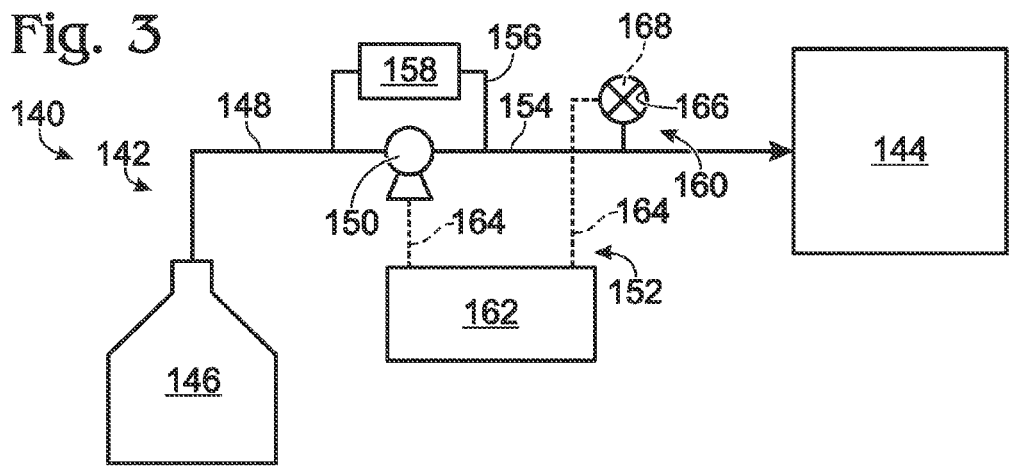
FIG. 3 is a partial schematic view of an additional example of a hydrogen generation assembly.

Another example of hydrogen generation assembly 20 is generally indicated at 140 in FIG. 3. Unless specifically excluded, hydrogen generation assembly 140 may include one or more components of one or more other hydrogen generation assemblies described in this disclosure. Hydrogen generation assembly 140 may include a feedstock delivery system or feed assembly 142 and a fuel processing assembly 144 configured to receive at least one feed stream from the feedstock delivery system and produce one or more product hydrogen stream(s), such as a hydrogen gas stream, from the feed stream(s).

The feedstock delivery system may include any suitable structure configured to deliver one or more feed and/or fuel streams to one or more other components of the hydrogen generation assembly, such as fuel processing assembly 144. For example, the feedstock delivery system may include a feedstock tank or feed tank (and/or container) 146, a feed conduit 148, a pump 150, and a control system 152. The feed tank may contain feedstock for one or more feed streams of the fuel processing assembly. For example, feed tank 146 may contain any suitable hydrogen-production fluid, such as water and a carbon-containing feedstock (e.g., a methanol/water mixture).

Feed conduit 148 may fluidly connect feed tank 146 with fuel processing assembly 144. The feed conduit may include a feed portion 154 and a bypass portion 156. The bypass portion may be configured to prevent overpressurization in the feed conduit, in the fuel processing assembly, and/or in one or more other components of hydrogen generation assembly 140. For example, bypass portion 156 may include a valve assembly 158, such as a pressure relief valve or a check valve.

Pump 150 may have any suitable structure configured to deliver one or more feed and/or fuel streams to the fuel processing assembly at a plurality of flowrates to fuel processing assembly 144 via, for example, feed conduit 148. For example, pump 150 may be a variable-speed pump (or a pump that includes a variable speed motor) that injects the feed and/or fuel streams into the fuel processing assembly under pressure. The pump may operate at a speed based on a control signal from the control system. For example, pump 150 may operate or turn at a higher speed (which results in the pump discharging the feed and/or fuel streams at a higher flowrate) when the control signal increases in magnitude, while the pump may operate or turn at a lower speed (which results in the pump discharging the feed and/or fuel streams at a lower flowrate) when the control signal decreases in magnitude.

Pressure in the fuel processing assembly (such as in the hydrogen-producing region of the fuel processing assembly) may increase with higher pump flowrates and may decrease with lower pump flowrates. For example, one or more fixed flow restriction devices in the fuel processing assembly may cause a proportional increase in pressure with higher pump flowrates, and a proportional decrease in pressure with lower pump flowrates. Because feed conduit 148 fluidly connects the feedstock delivery system and the fuel processing assembly, an increase (or decrease) in pressure in the fuel processing assembly may result in an increase (or decrease) in pressure in the feed conduit downstream from pump 150.

Control system 152 may include any suitable structure configured to control and/or operate pump 150 and/or other controlled devices of hydrogen generation assembly 140. For example, control system 152 may include a sensor assembly 160, a control assembly 162, and communication linkages 164.

The sensor assembly may include any suitable structure configured to detect and/or measure one or more suitable operating variables and/or parameters in the hydrogen generation assembly and/or generate one or more signals based on the detected and/or measured operating variable(s) and/or parameter(s). For example, the sensor assembly may detect mass, volume, flow, temperature, electrical current, pressure, refractive index, thermal conductivity, density, viscosity, optical absorbance, electrical conductivity, and/or other suitable variable(s), and/or parameter(s). In some embodiments, the sensor assembly may detect one or more triggering events. A "triggering event," as used herein, is a measurable event in which a predetermined threshold value or range of values representative of a predetermined amount of one or more of the components forming one or more streams associated with the hydrogen generation assembly is reached or exceeded.

For example, sensor assembly 160 may include one or more sensors 166 configured to detect pressure, temperature, flowrate, volume, and/or other parameters. Sensors 166 may, for example, include at least one feed sensor 168 configured to detect one or more suitable operating variables, parameters, and/or triggering events in feed conduit 148. The feed sensor may be configured to detect, for example, pressure in the feed conduit and/or generate one or more signals based on the detected pressure.

Control assembly 162 may be configured to communicate with sensor assembly 160 and pump 150 (and/or other controlled devices of hydrogen generation assembly 140) via communication linkages 164. For example, control assembly 162 may include any suitable structure configured to select a flowrate from the plurality of flowrates of pump 150 based on the detected pressure in the feed conduit, and/or to operate the pump at the selected flowrate. Communication linkages 164 may be any suitable wired and/or wireless mechanism for one- or two-way communication between the corresponding devices, such as input signals, command signals, measured parameters, etc.

Figure 4:
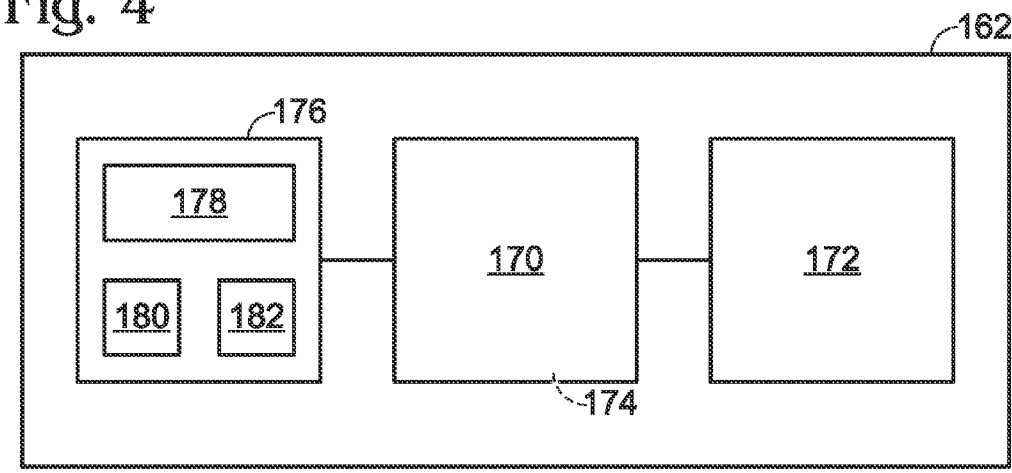
FIG. 4 is a schematic view of an example of a control assembly.

Control assembly 162 may, for example, include at least one processor 170, as shown in FIG. 4. The processor may communicate with sensor assembly 160 and pump 150 and/or other controlled-devices via communication linkages 148. Processor 170 may have any suitable form, such as a computerized device, software executing on a computer, an embedded processor, programmable logic controller, an analog device (with one or more resistors), and/or functionally equivalent devices. The control assembly may include any suitable software, hardware, and/or firmware. For example, control assembly 162 may include memory device(s) 172 in which preselected, preprogrammed, and/or user-selected operating parameters may be stored. The memory device may include volatile portion(s), nonvolatile portion(s), and/or both.

In some embodiments, processor 170 may be in the form of a signal conditioner 174, which may include any suitable structure configured to condition one or more signals received from sensor assembly 160. The signal conditioner may amplify, filter, convert, invert, range match, isolate, and/or otherwise modify one or more signals received from the sensor assembly such that the conditioned signals are suitable for downstream components. For example, signal conditioner 174 may invert one or more signals received from sensor assembly 160. "Invert," as used herein, refers to one or more of the following: converting a signal with a characteristic having ascending values to a signal with the characteristic having descending values, converting a signal with a characteristic having descending values to a signal with the characteristic having ascending values, converting a signal with a characteristic having a high value to a signal with the characteristic having a low value (or having the highest value to the lowest value), and/or converting a signal with a characteristic having a low value to a signal with the characteristic having a high value (or having the lowest value to the highest value). Characteristics of the signals may include voltage, current, etc. One or more of the converted values may match and/or correspond to values from the original signal, such as converting the highest original value to the lowest original value and/or converting the lowest original value to the highest original value. Alternatively, one or more of the converted values may be different from the original values of the signals.

In some embodiments, control assembly 162 may include a user interface 176, as shown in FIG. 4. The user interface may include any suitable structure configured to allow a user to monitor and/or interact with operation of processor 170. For example, user interface 176 may include a display region 178, a user input device 180, and/or a user-signaling device 182, as shown in FIG. 4. The display region may include a screen and/or other suitable display mechanism in which information is presented to the user. For example, display region 178 may display current values measured by one or more sensors 166, current operating parameters of the hydrogen generation assembly, stored threshold values or ranges, previously measured values, and/or other information regarding the operation and/or performance of the hydrogen generation assembly.

User input device 180 may include any suitable structure configured to receive input from the user and send that input to processor 170. For example, the user input device may include rotary dials, switches, push-buttons, keypads, keyboards, a mouse, touch screens, etc. User input device 180 may, for example, enable a user to specify how signals from sensor assembly 160 will be conditioned, such as whether the signal will be inverted, what the range of values of the inverted signal should be, etc. User-signaling device 182 may include any suitable structure configured to alert a user when an acceptable threshold level has been exceeded. For example, the user-signaling device may include an alarm, lights, and/or other suitable mechanism(s) for alerting a user.

In some embodiments, control assembly 162 may be configured to only condition signals received from sensor assembly 160 via signal conditioner 168 without additional processing of the signal and/or sending a different signal. In other words, the signal(s) from sensor assembly 160 may be conditioned via signal conditioner 168 and the conditioned signals may be sent to pump 150 and/or other controlled device(s) via communication linkages 164 to operate the pump and/or other controlled devices without additional processing by the control assembly and/or other assemblies.

The conditioned signal (such as an inverted signal) may be configured, for example, to select a flowrate for pump 150 from the plurality of flowrates. When the conditioned signal is configured to select a flowrate for the pump, the control assembly may be described as being configured to select the flowrate based on (or based solely on) the conditioned signal.

Figure 5:
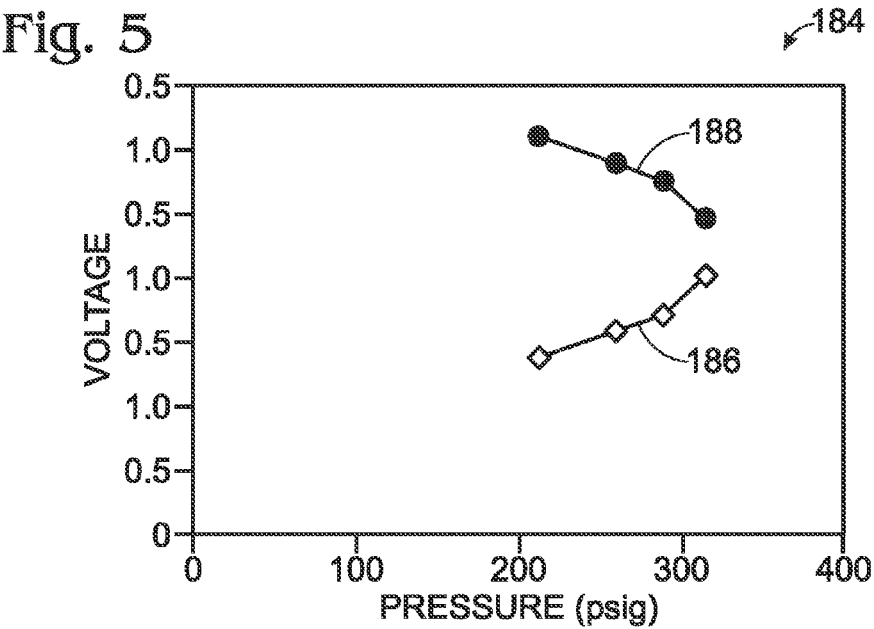
FIG. 5 is a graph showing an example of the control assembly of FIG. 4 receiving a detection signal and conditioning the detection signal to generate a conditioned signal.

An example of controlling pump 150 with a conditioned signal is shown in graph 184 in FIG. 5. Sensor assembly 160 may include feed sensor 168 that detects pressure and sends a detection signal 186 to control assembly 162 based on the detected pressure. The detection signal may be a voltage signal as shown in FIG. 5, a current signal, and/or other suitable signals that are proportional to the detected pressure. The detection signal(s) may be any suitable voltage(s) and/or current(s), such as 0-5 volts and/or 4-20 milliampere (mA).

Control assembly 162 may condition (such as invert) the detection signal into a conditioned signal 188 such that the conditioned signal is configured to select one or more parameters (such as flowrate and/or speed) for pump 150 and/or other controlled devices. The conditioned signal(s) may be any suitable voltage(s) and/or current(s), such as 0-5 volts and/or 4-20 mA. The voltages and pressure shown in FIG. 5 are only one example of the various voltages and pressures that may be generated and/or detected by control system 152. In other words, control system 152 is not limited to operation in the voltages and pressures shown in that figure.

Another example of hydrogen generation assembly 20 is generally indicated at 190 in FIG. 6. Unless specifically excluded, hydrogen generation assembly 190 may include one or more components of one or more other hydrogen generation assemblies described in this disclosure. Hydrogen generation assembly 190 may include a feedstock delivery system or feed assembly 192 and a fuel processing assembly 194 configured to receive at least one feed stream from the feedstock delivery system and produce one or more product hydrogen stream(s), such as a hydrogen gas stream, from the feed stream(s).

The feedstock delivery system may include a feedstock tank or feed tank (and/or container) 196, a feed conduit 198, a pump 200, and a control system 202. The feed tank may contain feedstock for one or more feed streams of the fuel processing assembly. Feed conduit 198 may fluidly connect feed tank 196 with fuel processing assembly 194. The feed conduit may include a feed portion 204 and a bypass portion 206. The bypass portion may be configured to prevent overpressurization in hydrogen generation assembly 190. For example, bypass portion 206 may include a pressure relief valve 208.

Pump 200 may have any suitable structure configured to deliver one or more feed and/or fuel streams to the fuel processing assembly at a plurality of flowrates to fuel processing assembly 194 via, for example, feed conduit 198. For example, pump 200 may be a variable-speed pump (or a pump that includes a variable speed motor) that injects the feed and/or fuel streams into the fuel processing assembly under pressure. The pump may operate at a speed based on a control signal from the control system.

Control system 202 may include any suitable structure configured to control and/or operate pump 200 and/or other controlled devices of hydrogen generation assembly 190. For example, control system 202 may include at least one pressure transducer 210, a control assembly 212, and communication linkages 214. Pressure transducer 210 may be configured to detect pressure in feed conduit 198. Although pressure transducer 210 is shown to be adjacent to pump 200 and/or bypass portion 206, the pressure transducer may be positioned in any suitable portions along the feed portion.

Control assembly 212 may include a power supply assembly 216 and a signal conditioner assembly 218. The power supply assembly may include any suitable structure configured to provide suitable power to the signal conditioner assembly. For example, the power supply assembly may include one or more batteries, one or more solar panels, one or more connectors for connecting to a DC or AC power source, etc. In some embodiments, power supply assembly 216 may include a DC power supply, which may provide the same voltage as is required to operate pump 200 and/or pressure transducer 210.

Signal conditioner assembly 218 may include any suitable structure configured to condition one or more signals received from pressure transducer 210 such that one or more of the conditioned signals may be used to operate pump 200. For example, signal conditioner assembly 218 may invert the pressure signals (or transducer signals) received from the pressure transducer and relay the inverted signals via communication linkages 214 to pump 200. The inverted signals may be configured to select a speed and/or flowrate for pump 200 among the plurality of speeds and/or flowrates for the pump. When the inverted signals are used to control the pump's speed, the signals may be referred to as "speed control signals."

An example of a purge assembly of the hydrogen generation assemblies described in the present disclosure is shown in FIG. 7 and is generally indicated at 220. The purge assembly may include any suitable structure configured to purge one or more other portions of a hydrogen generation assembly. Purge assembly 220 may be configured to purge one or more gases from reactor(s), purifier(s), fuel processing assembly(ies), and/or other component(s) and/or device(s) of hydrogen generation assemblies of the present disclosure and/or other hydrogen generation assemblies. For example, purge assembly 220 may include a pressurized gas assembly 222, a purge conduit 224, and a valve assembly 226. Purge conduit 224 may be configured to fluidly connect the pressurized gas assembly and one or more other portions of the hydrogen generation assembly.

Pressurized gas assembly 222 may include any suitable structure configured to connect to and/or receive at least one gas supply assembly 228. For example, pressurized gas assembly 222 may include any suitable connectors, piping, valves, and/or other components configured to connect to and/or receive gas supply assembly 228. The gas supply assembly may include one or more containers of pressurized gas (such as one or more cartridges and/or cylinders) and/or one or more tanks of pressurized gas. The gas supply assembly may include any suitable pressurized gas configured to purge one or more other components of the hydrogen generation assemblies described in the present disclosure. For example, gas supply assembly may include compressed carbon dioxide or compressed nitrogen.

Purge conduit 224 may be configured to fluidly connect the pressurized gas assembly and one or more other portions of the hydrogen generation assembly, such as the fuel processing assembly. The purge conduit may include any suitable connectors, piping, valves, and/or other components to provide for the fluid connection between the above assemblies.

Valve assembly 226 may include any suitable structure configured to manage flow of the pressurized gas through purge conduit 224 from pressurized gas assembly 222 to one or more other portions of the hydrogen generation assembly. For example, valve assembly 226 may be configured to allow at least one pressurized gas to flow through the purge conduit from the pressurized gas assembly to one or more other portions of the hydrogen generation assembly and/or to prevent the at least one pressurized gas to flow through the purge conduit from the pressurized gas assembly to one or more other portions of the hydrogen generation assembly. The valve assembly may be configured to allow or prevent flow based on one or more detected variable(s), parameter(s) and/or triggering event(s). For example, the valve assembly may be configured to allow flow of at least one pressurized gas from the pressurized gas assembly to one or more other portions of the hydrogen generation assembly when power to one or more portions of the hydrogen generation assembly is interrupted.

In some embodiments, a control system 230 may control one or more valves of valve assembly 226. Control system 230 may also control one or more other components of the hydrogen generation assembly, or may be dedicated to controlling only purge assembly 220. In some embodiments, valve assembly 226 may be configured to manage flow in the purge conduit independent of control system 230 and/or any control system of the hydrogen generation assembly. In other words, valve assembly 226 may be configured to selectively allow and prevent flow without direction from control system 230 and/or any control system of the hydrogen generation assembly.

The purge assembly may be located within enclosure or shell 66, external to the shell, or partially within the shell and partially external the shell. In some embodiments, at least a portion of the fuel processing assembly may be contained within an enclosure and at least a portion of the purge assembly may be contained within the enclosure, as shown in FIG. 1.

Purge assembly 220 may be connected to any suitable other component(s) of the hydrogen generation assembly. For example, as shown in FIG. 2, purge assembly 220 may be connected to the feed conduit either upstream of heat exchange assembly 136 (such as shown via purge conduit 224), and/or downstream of the heat exchange assembly (such as shown via a purge conduit 225). In some embodiments, the feed conduit of the hydrogen generation assembly may include a check valve 232 to prevent backflow of the pressurized gas into the feedstock delivery system, such as when the pump does not prevent backflow. The pressurized gas from the purge assembly may exit the hydrogen generation assembly at any suitable portions, such as the burner and/or the product hydrogen line.

Another example of purge assembly 220 is shown in FIG. 8 and is generally indicated at 232. Purge assembly 232 may include a pressurized gas assembly 234, a purge conduit 236, and a valve assembly 238. The pressurized gas assembly may include any suitable structure configured to receive at least one pressurized gas container 240 having at least one pressurized gas. Purge conduit 236 may include any suitable structure configured to fluidly connect pressurized gas assembly 234 and one or more other portions of the hydrogen generation assembly.

Valve assembly 238 may include any suitable structure configured to manage flow of the at least one pressurized gas through the purge conduit from the pressurized gas assembly to one or more other portions of the hydrogen generation assembly. For example, valve assembly 238 may include a manual valve 240 and a solenoid valve (or purge solenoid valve) 242, as shown in FIG. 8. The manual valve may be closed to isolate the pressurized gas assembly from one or more other portions of the hydrogen generation assembly, such as when installing or connecting a compressed or pressurized gas canister to the pressurized gas assembly. Manual valve 240 may then be opened to allow the solenoid valve to manage flow of the gas through the purge conduit from the pressurized gas assembly to one or more other portions of the hydrogen generation assembly. Manual valve 240 may sometimes be referred to as a "manual isolation valve."

Solenoid valve 242 may include at least one solenoid or purge solenoid 244 and at one valve or purge valve 246. The valve may be configured to move among a plurality of positions, including between a closed position and an open position. In the closed position, the pressurized gas assembly is isolated from one or more other portions of the hydrogen generation assembly and the pressurized gas does not flow through the purge conduit from the pressurized gas assembly. In the open position, the pressurized gas assembly is in fluid communication with one or more other portions of the hydrogen generation assembly and pressurized gas is allowed to flow through the purge conduit from the pressurized gas assembly. Solenoid 244 may be configured to move valve 226 between the open and closed positions based on one or more detected variable(s), parameter(s) and/or triggering event(s). Solenoid valve 242 may, for example, be configured to allow flow of at least one pressurized gas from the pressurized gas assembly to one or more other portions of the hydrogen generation assembly when power to the solenoid and/or one or more portions of the hydrogen generation assembly is interrupted, such as when power to the fuel processing assembly is interrupted.

For example, valve 246 may be configured to be in the open position without power to solenoid 244 (may also be referred to as "normally open"), such as via urging of one or more bias elements or springs (not shown). Additionally, valve 246 may be configured to be in the closed position with power to solenoid 244 (which may move the valve to the closed position against urging of the bias element(s)). Thus, a loss of electrical power to one or more portions of the hydrogen generation assembly (and/or a loss of electrical power to solenoid 244) may cause valve 246 to automatically move from the closed position to the open position. In other words, valve 246 of solenoid valve 242 may be configured to be in the closed position when there is power to the solenoid and/or one or more portions of the hydrogen generation assembly (such as the fuel processing assembly), and may automatically move to the open position when power to the solenoid and/or one or more portions of the hydrogen generation assembly is interrupted.

In some embodiments, solenoid valve 242 may be controlled by a control system 248. For example, control system 248 may be configured to send a control signal to solenoid 244 and the solenoid may be configured to move valve 246 to the closed position when the control signal is received. Additionally, valve 246 may be configured to automatically move to the open position when the solenoid does not receive a control signal from the control system. Control system 248 may control one or more other components of the hydrogen generation assembly or may be separate from any control system. The solenoid valve may, in some embodiments, be controlled by both the control system and whether power is supplied to the solenoid.

In some embodiments, purge assembly 220 may include a flow-restriction orifice 250, which may be configured to reduce or limit flow rate of the pressurized gas discharged from the pressurized gas assembly. For example, when the pressurized gas is nitrogen, the flow-restriction orifice may reduce or limit flow rate of the nitrogen gas to avoid overpressure in one or more other components of the hydrogen generation assembly, such as in the reformer and/or purifier. However, when the pressurized gas is liquefied compressed gas, such as carbon dioxide, the purge assembly may not include the flow-restriction orifice.

The purge assemblies of the present disclosure may be used as part of (or in) any suitable hydrogen generation assembly, such as a hydrogen generation assembly with a reformer but without a hydrogen purifier, a hydrogen generation assembly with a hydrogen purifier but without a reformer, a hydrogen generation assembly with a methanol/water reformer, a natural gas reformer, a LPG reformer, etc.

Figure 9:
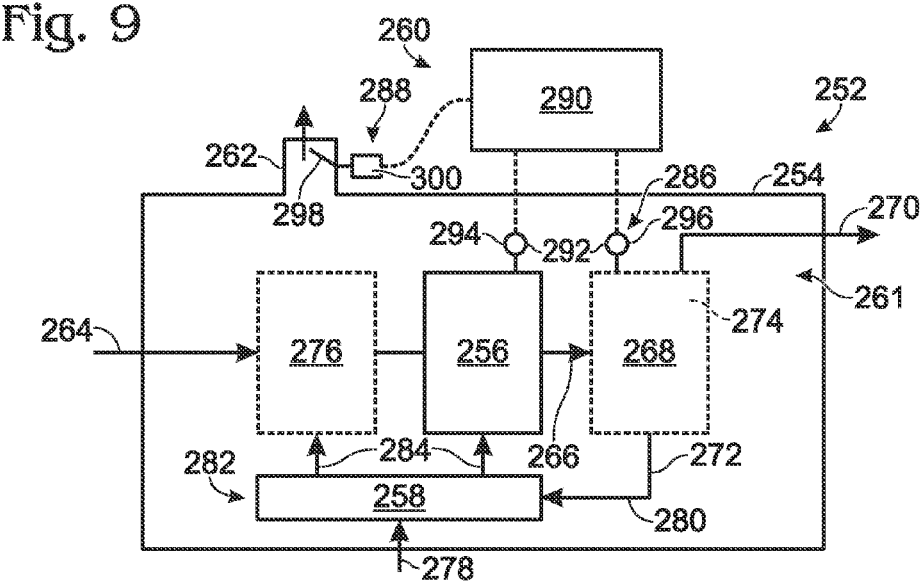
FIG. 9 is a partial schematic view of an additional example of a hydrogen generation assembly.

Another example of hydrogen generation assembly 20 is generally indicated at 252 in FIG. 9. Unless specifically excluded, hydrogen generation assembly 252 may include one or more components of one or more other hydrogen generation assemblies described in this disclosure. Hydrogen generation assembly 252 may include an enclosure or shell 254, a hydrogen-producing region 256, a heating assembly 258, and an exhaust management assembly 260. The enclosure or shell may include any suitable structure configured to at least partially contain one or more other components of hydrogen generation assembly 252 and/or provide insulation (such as thermal insulation) for those component(s). The enclosure may define an insulated zone or insulated hot zone 261 for the components within the enclosure. Enclosure 254 may include at least one exhaust port 262 configured to exhaust gases within the enclosure to the environment and/or to an exhaust collection system.

Hydrogen-producing region 256 may be partially or fully contained within the enclosure. The hydrogen-producing region may receive one or more feed streams 264 and produce an output stream 266 containing hydrogen gas via any suitable hydrogen-producing mechanism(s), such as steam reforming, autothermal reforming, etc. The output stream may include hydrogen gas as at least a majority component and may include additional gases. When hydrogen generation assembly 252 is a steam reforming hydrogen generation assembly, then the hydrogen-producing region may be referred to as being configured to produce, via a steam reforming reaction, a reformate stream 266.

In some embodiments, hydrogen generation assembly 252 may include a purification region 268, which may include any suitable structure configured to produce at least one hydrogen-rich (or permeate) stream 270 from output (or reformate) stream 266 and at least one byproduct stream 272 (which may contain no or some hydrogen gas). For example, the purification region may include one or more hydrogen-selective membranes 274. The hydrogen-selective membrane(s) may be configured to produce at least part of the permeate stream from the portion of the reformate stream that passes through the hydrogen-selective membrane(s), and to produce at least part of the byproduct stream from the portion of the reformate stream that does not pass through the hydrogen-selective membrane(s). In some embodiments, hydrogen generation assembly 252 may include a vaporization region 276, which may include any suitable structure configured to vaporize the feed stream(s) containing one or more liquid(s).

Heating assembly 258 may be configured to receive at least one air stream 278 and at least one fuel stream 280 and to combust the fuel stream(s) within a combustion region 282 contained within enclosure 254. Fuel stream 280 may be produced from the hydrogen-producing region (and/or the purification region), and/or may be produced independent of the hydrogen generation assembly. The combustion of the fuel stream(s) may produce one or more heated exhaust streams 284. The heated exhaust stream(s) may heat, for example, hydrogen-producing region 256, such as to at least a minimum hydrogen-producing temperature. Additionally, the heated exhaust stream(s) may heat vaporization region 276, such as to at least a minimum vaporization temperature.

Exhaust management assembly 260 may include any suitable structure configured to manage exhaust streams in enclosure 254, such as heated exhaust streams 284. For example, the exhaust management assembly may include a sensor assembly 286, a damper assembly 288, and a control assembly 290, as shown in FIG. 9.

Sensor assembly 286 may include any suitable structure configured to detect and/or measure one or more suitable operating variables and/or parameters in the hydrogen generation assembly and/or generate one or more signals based on the detected and/or measured operating variable(s) and/or parameter(s). For example, the sensor assembly may detect mass, volume, flow, temperature, electrical current, pressure, refractive index, thermal conductivity, density, viscosity, optical absorbance, electrical conductivity, and/or other suitable variable(s), and/or parameter(s). In some embodiments, the sensor assembly may detect one or more triggering events.

For example, sensor assembly 286 may include one or more sensors 292 configured to detect pressure, temperature, flowrate, volume, and/or other parameters in any suitable portion(s) of the hydrogen generation assembly. Sensors 292 may, for example, include at least one hydrogen-producing region sensor 294 configured to detect one or more suitable operating variables, parameters, and/or triggering events in hydrogen-producing region 256. The hydrogen-producing region sensor may be configured to detect, for example, temperature in the hydrogen-producing region and/or generate one or more signals based on the detected temperature in the hydrogen-producing region.

Additionally, sensors 292 may include at least one purification region sensor 296 configured to detect one or more suitable operating variables, parameters, and/or triggering events in purification region 268. The purification region sensor may be configured to detect, for example, temperature in the purification region and/or generate one or more signals based on the detected temperature in the purification region.

Damper assembly 288 may include any suitable structure configured to manage flow, such as the flow of exhaust gases (or heated exhaust stream(s) 284), through exhaust port 262. For example, damper assembly 288 may include at least one damper 298 and at least one actuator 300. The damper may be moveably connected to exhaust port 262. For example, damper 298 may be slidably, pivotably, and/or rotatably connected to the exhaust port.

Figure 10:
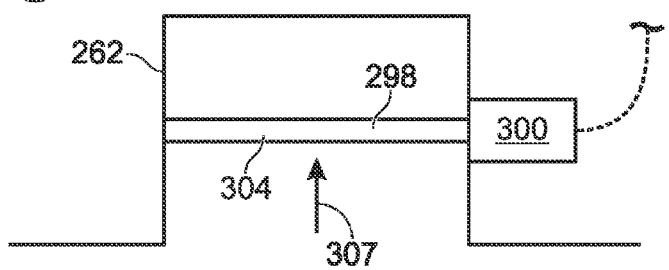
FIGS. 10-12 are partial schematic views of the hydrogen generation assembly of FIG. 9 showing another example of a damper and examples of positions for that damper.
Figure 11:
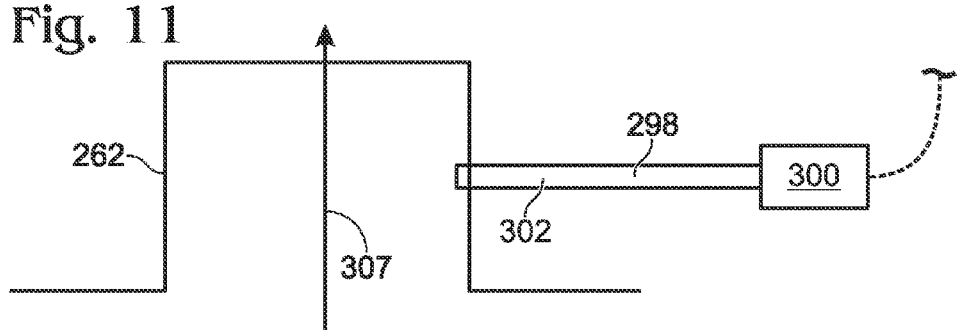
Figure 12:
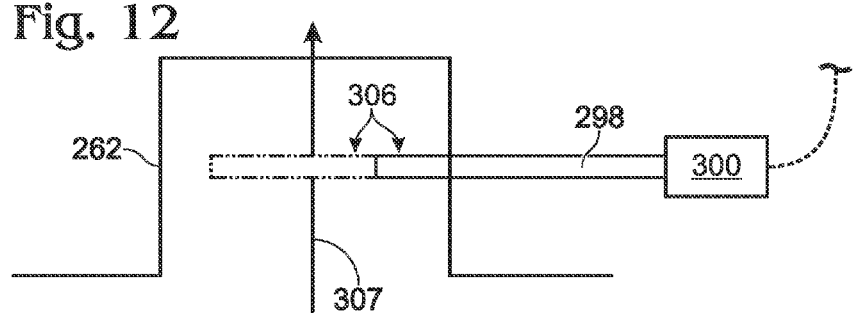

Additionally, the damper may be configured to move among a plurality of positions. Those positions may include, for example, a fully open position 302, a closed position 304, and a plurality of intermediate open positions 306 between the fully open and closed positions, as shown in FIGS. 10-12. In the fully open position, damper 298 may allow one or more exhaust streams 307 (such as heated exhaust stream(s) 284 and/or other exhaust gases in the enclosure) to flow through exhaust port 262. In the closed position, damper 298 may block the exhaust port and prevent exhaust stream(s) from flowing through the exhaust port. The intermediate open positions may allow the exhaust stream(s) to flow through exhaust port 262 at slower rate(s) than when the damper is in the fully open position. During operation, the temperature in the hydrogen-producing region may decrease when the exhaust stream(s) are restricted by the damper.

Damper 298 may include any suitable structure. For example, damper 298 may be a gate-type damper with one or more plates that slide across the exhaust port, such as shown in FIGS. 10-12. Additionally, damper 298 may be a flapper-type damper, such as shown in FIG. 9. The flapper-type damper may, for example, include full circle or half-circle inserts that pivot to open or close the exhaust. Actuator 300 may include any suitable structure configured to move damper 298 among the plurality of positions. In some embodiments, the actuator may move the damper incrementally between the fully open and closed positions. Although damper assembly 288 is shown to include a single damper and a single actuator, the damper assembly may include two or more dampers and/or two or more actuators.

Control assembly 290 may include any suitable structure configured to control damper assembly 288 based, at least in part, on input(s) from sensor assembly 286, such as based, at least in part, on detected and/or measured operating variable(s) and/or parameter(s) by the sensor assembly. Control assembly 290 may receive input(s) only from sensor assembly 286 or the control assembly may receive input(s) from other sensor assemblies of the hydrogen generation assembly. Control assembly 290 may control only damper assembly, or the control assembly may control one or more other components of the hydrogen generation assembly.

Control assembly 290 may, for example, be configured to move damper 298, such as via actuator 300, between the fully open and closed positions based, at least in part, on the detected temperature in the hydrogen-producing region and/or the purification region. When control assembly 290 receives inputs from two or more sensors, the control assembly may select the input with a higher value, may select the input with a lower value, may calculate an average of the input values, may calculate a median of the input values, and/or perform other suitable calculation(s). For example, control assembly 290 may be configured to move the damper toward (or incrementally toward) the closed position when detected temperature in the hydrogen-producing and/or purification regions are above a predetermined maximum temperature, and/or to move the damper toward (or incrementally toward) the fully open position when the detected temperature in the hydrogen-producing and/or purification regions are below a predetermined minimum temperature. The predetermined maximum and minimum temperatures may be any suitable maximum and minimum temperatures. For example, the maximum and minimum temperatures may be set based on a desired range of temperatures for operating the vaporization, hydrogen-producing, and/or purification regions.

Figure 13:
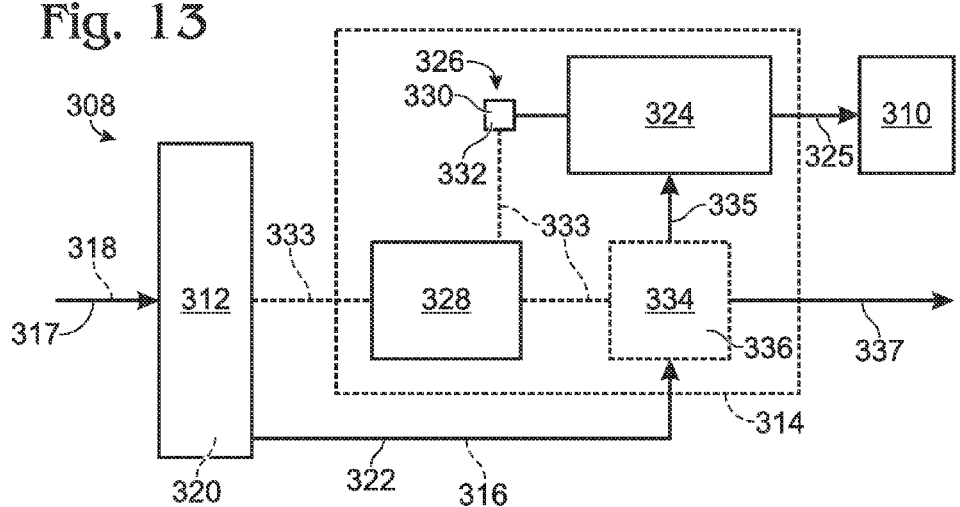
FIG. 13 is a partial schematic view of a further example of a hydrogen generation assembly.

Another example of hydrogen generation assembly 20 is generally indicated at 308 in FIG. 13. Unless specifically excluded, hydrogen generation assembly 308 may include one or more components of one or more other hydrogen generation assemblies described in this disclosure. The hydrogen generation assembly may provide or supply hydrogen to one or more hydrogen consuming devices 310, such as a fuel cell, hydrogen furnace, etc. Hydrogen generation assembly 308 may, for example, include a fuel processing assembly 312 and a product hydrogen management system 314.

Fuel processing assembly 312 may include any suitable structure configured to generate one or more product hydrogen streams 316 (such as one or more hydrogen gas streams) from one or more feed streams 318 via one or more suitable mechanisms, such as steam reforming, autothermal reforming, electrolysis, thermolysis, partial oxidation, plasma reforming, photocatalytic water splitting, sulfur-iodine cycle, etc. For example, fuel processing assembly 312 may include one or more hydrogen generator reactors 320, such as reformer(s), electrolyzer(s), etc. Feed stream(s) 318 may be delivered to the fuel processing assembly via one or more feed conduits 317 from one or more feedstock delivery systems (not shown).

Fuel processing assembly 312 may be configured to be operable among a plurality of modes, such as a run mode and a standby mode. In the run mode, the fuel processing assembly may produce or generate the product hydrogen stream(s) from the feed stream(s). For example, in the run mode, the feedstock delivery system may deliver the feed stream to the fuel processing assembly and/or may perform other operation(s). Additionally, in the run mode, the fuel processing assembly may receive the feed stream, may combust the fuel stream via the heating assembly, may vaporize the feed stream via the vaporization region, may generate the output stream via the hydrogen producing region, may generate the product hydrogen stream and the byproduct stream via the purification region, and/or may perform other operations.

In the standby mode, fuel processing assembly 312 may not produce the product hydrogen stream(s) from the feed stream(s). For example, in the standby mode, the feedstock delivery system may not deliver the feed stream to the fuel processing assembly and/or may not perform other operation(s). Additionally, in the standby mode, the fuel processing assembly may not receive the feed stream, may not combust the fuel stream via the heating assembly, may not vaporize the feed stream via the vaporization region, may not generate the output stream via the hydrogen producing region, may not generate the product hydrogen stream and the byproduct stream via the purification region, and/or may not perform other operations. The standby mode may include when the fuel processing assembly is powered down or when there is no power to the fuel processing assembly.

In some embodiments, the plurality of modes may include one or more reduced output modes. For example, fuel processing assembly 312 may produce or generate product hydrogen stream(s) 316 at a first output rate when in the run mode (such as at a maximum output rate or normal output rate), and produce or generate the product hydrogen stream(s) at second, third, fourth, or more rates that are lower (or higher) than the first rate when in the reduced output mode (such as at a minimum output rate).

Product hydrogen management system 314 may include any suitable structure configured to manage product hydrogen generated by fuel processing assembly 312. Additionally, the product hydrogen management system may include any suitable structure configured to interact with fuel processing assembly 312 to maintain any suitable amount of product hydrogen available for hydrogen consuming device(s) 310. For example, product hydrogen management system 314 may include a product conduit 322, a buffer tank 324, a buffer tank conduit 325, a sensor assembly 326, and a control assembly 328.

Product conduit 322 may be configured to fluidly connect fuel processing assembly 312 with buffer tank 324. Buffer tank 324 may be configured to receive product hydrogen stream 316 via product conduit 322, to retain a predetermined amount or volume of the product hydrogen stream, and/or to provide the product hydrogen stream to one or more hydrogen consuming devices 310. In some embodiments, the buffer tank may be a lower-pressure buffer tank. The buffer tank may be any suitable size based on one or more factors, such as expected or actual hydrogen consumption by the hydrogen consuming device(s), cycling characteristics of the hydrogen generator reactor, fuel processing assembly, etc.

In some embodiments, buffer tank 324 may be sized to provide enough hydrogen for a minimum amount of time of operation of the hydrogen consuming device(s) and/or for a minimum amount of time of operation for the fuel processing assembly, such as a minimum amount of time of operation for the vaporization region, hydrogen-producing region, and/or purification region. For example, the buffer tank may be sized for two, five, ten, or more minutes of operation of the fuel processing assembly. Buffer tank conduit 325 may be configured to fluidly connect buffer tank 324 with hydrogen consuming device(s) 310.

Sensor assembly 326 may include any suitable structure configured to detect and/or measure one or more suitable operating variables and/or parameters in the buffer tank and/or generate one or more signals based on the detected and/or measured operating variable(s) and/or parameter(s).

For example, the sensor assembly may detect mass, volume, flow, temperature, electrical current, pressure, refractive index, thermal conductivity, density, viscosity, optical absorbance, electrical conductivity, and/or other suitable variable(s), and/or parameter(s). In some embodiments, the sensor assembly may detect one or more triggering events.

For example, sensor assembly 326 may include one or more sensors 330 configured to detect pressure, temperature, flowrate, volume, and/or other parameters. Sensors 330 may, for example, include at least one buffer tank sensor 332 configured to detect one or more suitable operating variables, parameters, and/or triggering events in the buffer tank. The buffer tank sensor may be configured to detect, for example, pressure in the buffer tank and/or generate one or more signals based on the detected pressure. For example, unless product hydrogen is being withdrawn from the buffer tank at a flow rate that is equal to, or greater than, the incoming flow rate into the buffer tank, the pressure of the buffer tank may increase and the tank sensor may detect the increase of pressure in the buffer tank.

Control assembly 328 may include any suitable structure configured to control fuel processing assembly 312 based, at least in part, on input(s) from sensor assembly 326, such as based, at least in part, on detected and/or measured operating variable(s) and/or parameter(s) by the sensor assembly. Control assembly 328 may receive input(s) only from sensor assembly 326 or the control assembly may receive input(s) from other sensor assemblies of the hydrogen generation assembly. Control assembly 328 may control only the fuel processing assembly, or the control assembly may control one or more other components of the hydrogen generation assembly. The control assembly may communicate with the sensor assembly, the fuel processing assembly, and/or a product valve assembly (further described below) via communication linkages 333. Communication linkages 333 may be any suitable wired and/or wireless mechanism for one- or two-way communication between the corresponding devices, such as input signals, command signals, measured parameters, etc.

Control assembly 328 may, for example, be configured to operate fuel processing assembly 312 between the run and standby modes based, at least in part, on the detected pressure in buffer tank 324. For example, control assembly 328 may be configured to operate the fuel processing assembly in the standby mode when the detected pressure in the buffer tank is above a predetermined maximum pressure, and/or to operate the fuel processing assembly in the run mode when the detected pressure in the buffer tank is below a predetermined minimum pressure.

The predetermined maximum and minimum pressures may be any suitable maximum and minimum pressures. Those predetermined pressures may be independently set, or set without regard to other predetermined pressure(s) and/or other predetermined variable(s). For example, the predetermined maximum pressure may be set based on the operating pressure range of the fuel processing assembly, such as to prevent overpressure in the fuel processing assembly because of back pressure from the product hydrogen management system. Additionally, the predetermined minimum pressure may be set based on the pressure required by the hydrogen consuming device(s). Alternatively, control assembly 328 may operate the fuel processing assembly to operate in the run mode within a predetermined range of pressure differentials (such as between the fuel processing assembly and the buffer tank and/or between the buffer tank and the hydrogen consuming device(s)), and in the standby mode when outside the predetermined range of pressure differentials.

In some embodiments, product hydrogen management system 314 may include a product valve assembly 334, which may include any suitable structure configured to manage and/or direct flow in product conduit 322. For example, the product valve assembly may allow the product hydrogen stream to flow from the fuel processing assembly to the buffer tank, as indicated at 335. Additionally, product valve assembly 334 may be configured to vent product hydrogen stream 316 from fuel processing assembly 312, as indicated at 337. The vented product hydrogen stream may be discharged to atmosphere and/or to a vented product hydrogen management system (not shown).

Product valve assembly 334 may, for example, include one or more valves 336 that are configured to operate between a flow position in which the product hydrogen stream from the fuel processing assembly flows through the product conduit and into the buffer tank, and a vent position in which the product hydrogen stream from the fuel processing assembly is vented. Valve(s) 336 may be positioned along any suitable portion(s) of the product conduit prior to the buffer tank.

Control assembly 328 may be configured to operate the product valve assembly based on, for example, input(s) from sensor assembly. For example, the control assembly may direct or control the product valve assembly (and/or valve(s) 336) to vent the product hydrogen stream from the fuel processing assembly when the fuel processing assembly is in the standby mode. Additionally, control assembly 328 may direct or control product valve assembly 334 (and/or valve(s) 336) to allow the product hydrogen stream to flow from the fuel processing assembly to the buffer tank when fuel processing assembly 312 is in the run mode and/or reduced output mode(s).

Figure 14:
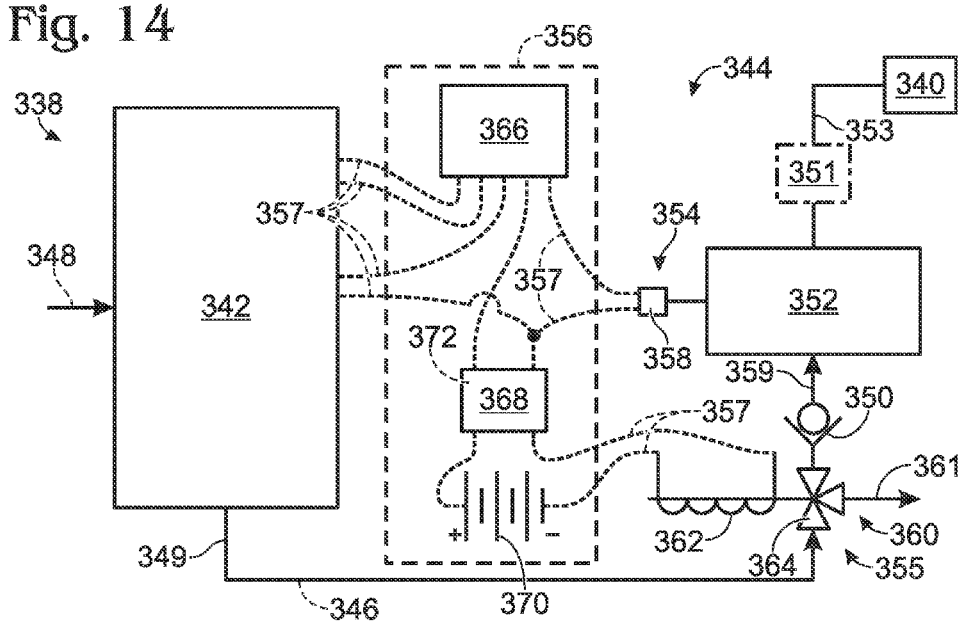
FIG. 14 is a partial schematic view of another example of a hydrogen generation assembly.

Another example of hydrogen generation assembly 20 is generally indicated at 338 in FIG. 14. Unless specifically excluded, hydrogen generation assembly 338 may include one or more components of one or more other hydrogen generation assemblies described in this disclosure. The hydrogen generation assembly may provide or supply hydrogen to one or more hydrogen consuming devices 340, such as a fuel cell, hydrogen furnace, etc. Hydrogen generation assembly 338 may, for example, include a fuel processing assembly 342 and a product hydrogen management system 344. Fuel processing assembly 342 may include any suitable structure configured to generate one or more product hydrogen streams 346 (such as one or more hydrogen gas streams) from one or more feed streams 348 via one or more suitable mechanisms.

Product hydrogen management system 344 may include any suitable structure configured to manage product hydrogen generated by fuel processing assembly 342. Additionally, the product hydrogen management system may include any suitable structure configured to interact with fuel processing assembly 342 to maintain any suitable amount of product hydrogen available for hydrogen consuming device(s) 340. For example, product hydrogen management system 344 may include a product conduit 349, a buffer tank 352, a buffer tank conduit 353, a buffer tank sensor assembly 354, a product valve assembly 355, and a control assembly 356.

Product conduit 349 may be configured to fluidly connect fuel processing assembly 342 with buffer tank 352. The product conduit may include any suitable number of valves, such as check valve(s) (such as check valve 350), control valve(s), and/or other suitable valves. Check valve 350 may prevent backflow from the buffer tank toward the fuel processing assembly. The check valve may open at any suitable pressures, such as 1 psi or less. Buffer tank 352 may be configured to receive product hydrogen stream 346 via product conduit 349, to retain a predetermined amount or volume of the product hydrogen stream, and/or to provide the product hydrogen stream to one or more hydrogen consuming devices 340.

Buffer tank conduit 353 may be configured to fluidly connect buffer tank 352 and hydrogen consuming device(s) 340. The buffer tank conduit may include any suitable number of valves, such as check valve(s), control valve(s), and/or other suitable valve(s). For example, the buffer tank conduit may include one or more control valves 351. Control valve 351 may allow isolation of the buffer tank and/or other components of the hydrogen generation assembly. The control valve may, for example, be controlled by control assembly 356 and/or other control assembly(ies).

Tank sensor assembly 354 may include any suitable structure configured to detect and/or measure one or more suitable operating variables and/or parameters in the buffer tank and/or generate one or more signals based on the detected and/or measured operating variable(s) and/or parameter(s). For example, the buffer tank sensor assembly may detect mass, volume, flow, temperature, electrical current, pressure, refractive index, thermal conductivity, density, viscosity, optical absorbance, electrical conductivity, and/or other suitable variable(s), and/or parameter(s). In some embodiments, the buffer tank sensor assembly may detect one or more triggering events. For example, buffer tank sensor assembly 354 may include one or more tank sensors 358 configured to detect pressure, temperature, flowrate, volume, and/or other parameters. Buffer tank sensors 358 may, for example, be configured to detect pressure in the buffer tank and/or generate one or more signals based on the detected pressure.

Product valve assembly 355 may include any suitable structure configured to manage and/or direct flow in product conduit 349. For example, the product valve assembly may allow the product hydrogen stream to flow from the fuel processing assembly to the buffer tank, as indicated at 359. Additionally, product valve assembly 355 may be configured to vent product hydrogen stream 346 from fuel processing assembly 342, as indicated at 361. The vented product hydrogen stream may be discharged to atmosphere and/or to a vented product hydrogen management system (not shown) including discharging vented product hydrogen back to the fuel processing assembly.

Figure 15:
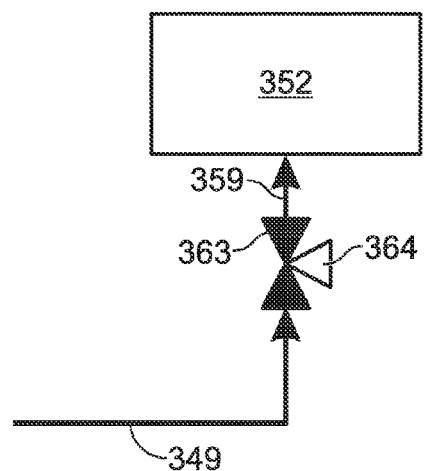
FIG. 15 is a partial schematic view of the hydrogen generation assembly of FIG. 14 showing a three-way valve in a flow position.
Figure 16:
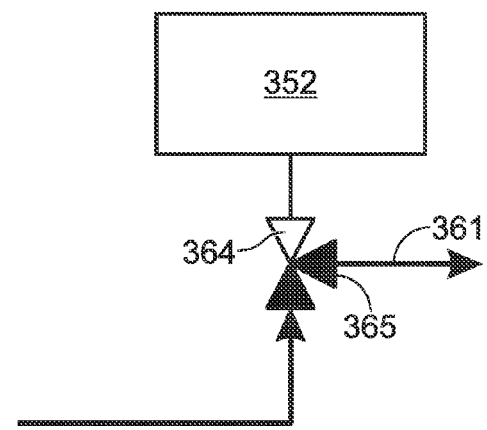
FIG. 16 is a partial schematic view of the hydrogen generation assembly of FIG. 14 showing the three-way valve of FIG. 15 in a vent position.

Product valve assembly 355 may, for example, include a three-way solenoid valve 360. The three-way solenoid valve may include a solenoid 362 and a three-way valve 364. The three-way valve may be configured to move between a plurality of positions. For example, three-way valve 364 may be configured to move between a flow position 363 and a vent position 365, as shown in FIGS. 15-16. In the flow position, the product hydrogen stream is allowed to flow from the fuel processing assembly to the buffer tank, as indicated at 359. In the vent position, the product hydrogen stream from the fuel processing assembly is vented, as indicated at 361. Additionally, the three-way valve may be configured to isolate the buffer tank from the product hydrogen stream when the valve is in the vent position. Solenoid 362 may be configured to move valve 364 between the flow and vent positions based on input(s) received from control assembly 356 and/or other control assembly(ies).

Control assembly 356 may include any suitable structure configured to control fuel processing assembly 342 and/or product valve assembly 355 based, at least in part, on input(s) from buffer tank sensor assembly 354, such as based, at least in part, on detected and/or measured operating variable(s) and/or parameter(s) by the buffer tank sensor assembly. Control assembly 356 may receive input(s) only from buffer tank sensor assembly 354 and/or the control assembly may receive input(s) from other sensor assemblies of the hydrogen generation assembly. Additionally, control assembly 356 may control only the fuel processing assembly, only the product valve assembly, only both the fuel processing assembly and the product valve assembly, or the fuel processing assembly, product valve assembly and/or one or more other components of the hydrogen generation assembly. Control assembly 356 may communicate with the fuel processing assembly, the buffer tank sensor assembly, and the product valve assembly via communication linkages 357. Communication linkages 357 may be any suitable wired and/or wireless mechanism for one- or two-way communication between the corresponding devices, such as input signals, command signals, measured parameters, etc.

Control assembly 356 may, for example, be configured to operate fuel processing assembly 342 among or between the run and standby modes (and/or reduced output mode(s)) based, at least in part, on the detected pressure in buffer tank 352. For example, control assembly 356 may be configured to operate the fuel processing assembly in the standby mode when the detected pressure in the buffer tank is above a predetermined maximum pressure, to operate the fuel processing assembly in one or more reduced output mode(s) when the detected pressure in the buffer tank is below a predetermined maximum pressure and/or above a predetermined operating pressure, and/or to operate the fuel processing assembly in the run mode when the detected pressure in the buffer tank is below a predetermined operating pressure and/or predetermined minimum pressure. The predetermined maximum and minimum pressures and/or predetermined operating pressure(s) may be any suitable pressures. For example, the one or more of the above pressures may be independently set based on a desired range of pressures for the fuel processing assembly, product hydrogen in the buffer tank, and/or the pressure requirements of the hydrogen consuming device(s). Alternatively, control assembly 356 may operate the fuel processing assembly to operate in the run mode within a predetermined range of pressure differentials (such as between the fuel processing assembly and the buffer tank), and in the reduced output and/or standby mode when outside the predetermined range of pressure differentials.

Additionally, control assembly 356 may be configured to operate the product valve assembly based on, for example, input(s) from sensor assembly. For example, the control assembly may direct or control solenoid 362 to move three-way valve 364 to the vent position when the fuel processing assembly is in the standby mode. Additionally, control assembly 356 may direct or control the solenoid to move three-way valve 364 to the flow position when fuel processing assembly 342 is in the run mode.

Control assembly 356 may, for example, include a controller 366, a switching device 368, and a power supply 370. Controller 366 may have any suitable form, such as a computerized device, software executing on a computer, an embedded processor, programmable logic controller, an analog device, and/or functionally equivalent devices. Additionally, the controller may include any suitable software, hardware, and/or firmware.

Switching device 368 may include any suitable structure configured to allow controller 366 to control solenoid 362. For example, the switching device may include a solid-state relay 372. The solid-state relay may allow controller 366 to control solenoid 362 via power supply 370. For example, when solenoid 362 is controlled with 24 volts, the solid-state relay may allow controller 366 to use a voltage signal less than 24 volts (such as 5 volts) to control solenoid 362. Power supply 370 may include any suitable structure configured to provide power sufficient to control solenoid 362. For example, power supply 370 may include one or more batteries, one or more solar panels, etc. In some embodiments, the power supply may include one or more electrical outlet connectors and one or more rectifiers (not shown). Although the solenoid and controller are described to operate at certain voltages, the solenoid and controller may operate at any suitable voltages.

Another example of hydrogen generation assembly 20 is generally indicated at 374 in FIG. 17. Unless specifically excluded, hydrogen generation assembly 374 may include one or more components of one or more other hydrogen generation assemblies described in this disclosure. The hydrogen generation assembly may provide or supply hydrogen to one or more hydrogen consuming devices 376, such as a fuel cell, hydrogen furnace, etc. Hydrogen generation assembly 374 may, for example, include a fuel processing assembly 378 and a product hydrogen management system 380. Fuel processing assembly 378 may include any suitable structure configured to generate one or more product hydrogen streams 382 (such as one or more hydrogen gas streams) from one or more feed streams 384 via one or more suitable mechanisms.

Product hydrogen management system 380 may include any suitable structure configured to manage product hydrogen generated by fuel processing assembly 382 and/or interact with fuel processing assembly 382 to maintain any suitable amount of product hydrogen available for hydrogen consuming device(s) 376. For example, product hydrogen management system 380 may include a product conduit 386, a buffer tank 388, a buffer tank conduit 389, a tank sensor assembly 390, a product valve assembly 392, and a control assembly 394.

Product conduit 386 may be configured to fluidly connect fuel processing assembly 378 with buffer tank 388. The product conduit may include a flow portion or leg 395 and a vent portion or leg 396. Additionally, product conduit 386 may include any suitable number of valves, such as check valve(s) (such as check valve 397), control valve(s), and/or other suitable valve(s). Buffer tank 388 may be configured to receive product hydrogen stream 382 via product conduit 386, to retain predetermined amount(s) or volume(s) of the product hydrogen stream, and/or to provide the product hydrogen stream to one or more hydrogen consuming devices 376.

Buffer tank conduit 389 may be configured to fluidly connect buffer tank 388 with hydrogen consuming device(s) 376. The buffer tank conduit may include any suitable number of valves, such as check valve(s), control valve(s), and/or other suitable valve(s). For example, the buffer tank conduit may include one or more control valves 398. Control valve 398 may allow isolation of the buffer tank and/or other components of the hydrogen generation assembly. The control valve may, for example, be controlled by control assembly 394 and/or other control assembly(ies).

Tank sensor assembly 390 may include any suitable structure configured to detect and/or measure one or more suitable operating variables and/or parameters in the buffer tank and/or generate one or more signals based on the detected and/or measured operating variable(s) and/or parameter(s). For example, the tank sensor assembly may detect mass, volume, flow, temperature, electrical current, pressure, refractive index, thermal conductivity, density, viscosity, optical absorbance, electrical conductivity, and/or other suitable variable(s), and/or parameter(s). In some embodiments, the tank sensor assembly may detect one or more triggering events. For example, tank sensor assembly 390 may include one or more tank sensors 400 configured to detect pressure, temperature, flowrate, volume, and/or other parameters. Tank sensors 400 may, for example, be configured to detect pressure in the buffer tank and/or generate one or more signals based on the detected pressure.

Product valve assembly 392 may include any suitable structure configured to manage and/or direct flow in product conduit 386. For example, the product valve assembly may allow the product hydrogen stream to flow from the fuel processing assembly to the buffer tank (as indicated at 401), and/or vent product hydrogen stream 382 from fuel processing assembly 378 (as indicated at 403). The vented product hydrogen stream may be discharged to atmosphere and/or to a vented product hydrogen management system (not shown).

Figure 18:
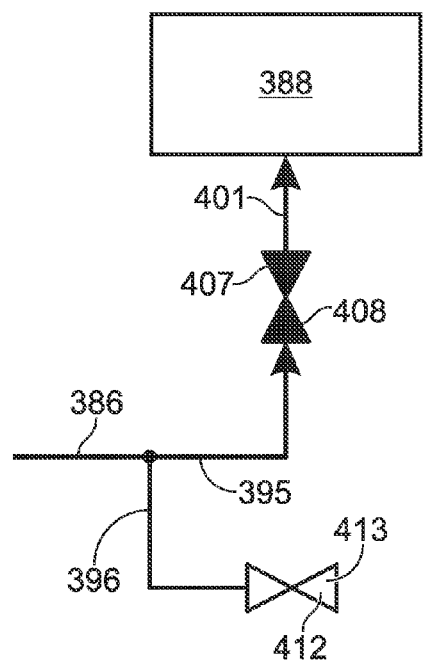
FIG. 18 is a partial schematic view of the hydrogen generation assembly of FIG. 17 showing a first valve in an open position and a second valve in a closed position.
Figure 19:
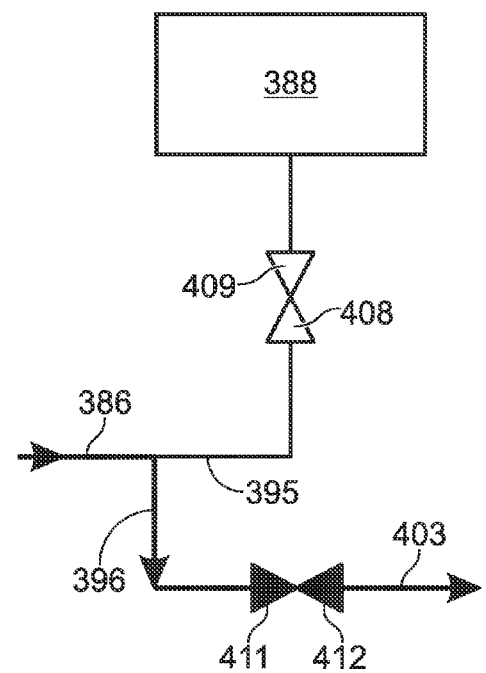
FIG. 19 is a partial schematic view of the hydrogen generation assembly of FIG. 17 showing the first valve of FIG. 18 in a closed position and the second valve of FIG. 18 in an open position.

Product valve assembly 392 may, for example, include a first solenoid valve 402 and a second solenoid valve 404. The first solenoid valve may include a first solenoid 406 and a first valve 408, while the second solenoid valve may include a second solenoid 410 and a second valve 412. As shown in FIGS. 18-19, the first valve may be configured to move between a plurality of positions, including a first open position 407 and a first closed position 409. Additionally, the second valve may be configured to move between a plurality of positions, including a second open position 411 and a second closed position 413.

When the first valve is in the open position, the product hydrogen stream is allowed to flow from the fuel processing assembly to the buffer tank. In contrast, when the first valve is in the closed position, buffer tank is isolated from the product hydrogen stream from the fuel processing assembly (or the product hydrogen stream from the fuel processing assembly is not allowed to flow to the buffer tank). When the second valve is in the open position, the product hydrogen stream from the fuel processing assembly is vented. In contrast, when the second valve is in the closed position, the product hydrogen stream from the fuel processing assembly is not vented.

First solenoid 406 may be configured to move first valve 408 between the open and closed positions based on input(s) received from control assembly 394. Additionally, second solenoid 410 may be configured to move second valve 412 between the open and closed position based on input(s) received from the control assembly.

Control assembly 394 may include any suitable structure configured to control fuel processing assembly 378 and/or product valve assembly 392 based, at least in part, on input(s) from buffer tank sensor assembly 390, such as based, at least in part, on detected and/or measured operating variable(s) and/or parameter(s) by the buffer tank sensor assembly. Control assembly 394 may receive input(s) only from buffer tank sensor assembly 390 and/or the control assembly may receive input(s) from other sensor assemblies of the hydrogen generation assembly. Additionally, control assembly 394 may control only the fuel processing assembly, only the product valve assembly, only both the fuel processing assembly and the product valve assembly, or the fuel processing assembly, product valve assembly and/or one or more other components of the hydrogen generation assembly. Control assembly 394 may communicate with the fuel processing assembly, the buffer tank sensor assembly, and/or the product valve assembly via communication linkages 393. Communication linkages 393 may be any suitable wired and/or wireless mechanism for one- or two-way communication between the corresponding devices, such as input signals, command signals, measured parameters, etc.

Control assembly 394 may, for example, be configured to operate fuel processing assembly 378 between the run and standby modes (and/or reduced output mode(s)) based, at least in part, on the detected pressure in buffer tank 388. For example, control assembly 394 may be configured to operate the fuel processing assembly in the standby mode when the detected pressure in the buffer tank is above a predetermined maximum pressure, to operate the fuel processing assembly in one or more reduced output mode(s) when the detected pressure in the buffer tank is below a predetermined maximum pressure and/or above a predetermined operating pressure, and/or to operate the fuel processing assembly in the run mode when the detected pressure in the buffer tank is below a predetermined operating pressure and/or predetermined minimum pressure. The predetermined maximum and minimum pressures and/or predetermined operating pressure(s) may be any suitable pressures. For example, the one or more of the above pressures may be independently set based on a desired range of pressures for the fuel processing assembly, the product hydrogen in the buffer tank, and/or the pressure requirements of the hydrogen consuming device(s). Alternatively, control assembly 394 may operate the fuel processing assembly to operate in the run mode within a predetermined range of pressure differentials (such as between the fuel processing assembly and the buffer tank and/or between the buffer tank and the hydrogen consuming device(s)), and in the reduced output and/or standby mode(s) when outside the predetermined range of pressure differentials.

Additionally, control assembly 394 may be configured to operate the product valve assembly based on, for example, input(s) from sensor assembly. For example, the control assembly may direct or control the first and/or second solenoids to move the first valve in the closed position and/or the second valve in the open position when the fuel processing assembly is in the standby mode. Additionally, control assembly 394 may direct or control the first and/or second solenoids to move the first valve in the open position and/or the second valve in the closed position when fuel processing assembly 378 is in the run mode and/or reduced output mode(s).

Control assembly 394 may, for example, include a controller 414, a switching device 416, and a power supply 418. Controller 414 may have any suitable form, such as a computerized device, software executing on a computer, an embedded processor, programmable logic controller, an analog device, and/or functionally equivalent devices. Additionally, the controller may include any suitable software, hardware, and/or firmware.

Switching device 416 may include any suitable structure configured to allow controller 414 to control the first and/or second solenoids. For example, the switching device may include a solid-state relay 420. Power supply 418 may include any suitable structure configured to provide power sufficient to control the first and/or second solenoids.

Hydrogen generation assemblies of the present disclosure may include one or more of the following:

A feed assembly configured to deliver a feed stream to a fuel processing assembly.

A feed tank configured to contain feedstock for a feed stream.

A feed conduit fluidly connecting a feed tank and a fuel processing assembly.

A pump configured to deliver a feed stream at a plurality of flowrates to a fuel processing assembly via a feed conduit.

A feed sensor assembly configured to detect pressure in a feed conduit downstream from a pump.

A feed sensor assembly configured to generate a signal based on detected pressure.

A pump controller configured to select a flowrate from a plurality of flowrates based on detected pressure.

A pump controller configured to operate a pump at a selected flowrate.

A pump controller configured to select a flowrate for a pump based solely on detected pressure.

A pump controller configured to condition a signal received from a sensor assembly.

A pump controller configured to invert a signal received from a feed sensor assembly.

A pump controller configured to select a flowrate based on a conditioned signal.

A pump controller configured to select a flowrate based on an inverted signal.

A fuel processing assembly configured to receive a feed stream.

A fuel processing assembly configured to produce a product hydrogen stream from a feed stream.

A fuel processing assembly configured to be operable among a plurality of modes.

A fuel processing assembly configured to be operable among a run mode in which the fuel processing assembly produces a product hydrogen stream from a feed stream, and a standby mode in which the fuel processing assembly does not produce the product hydrogen stream from the feed stream.

A purge assembly.

A pressurized gas assembly configured to receive at least one container of pressurized gas that is configured to purge a fuel processing assembly.

A purge conduit configured to fluidly connect a pressurized gas assembly and a fuel processing assembly.

A purge valve assembly configured to allow at least one pressurized gas to flow through a purge conduit from a pressurized gas assembly to a hydrogen generation assembly when power to the hydrogen generation assembly is interrupted.

A solenoid valve that moves between a closed position in which at least one pressurized gas does not flow through a purge conduit from a pressurized gas assembly, and an open position in which the at least one pressurized gas is allowed to flow through the purge conduit from the pressurized gas assembly.

A solenoid valve that is in the closed position when there is power to a fuel processing assembly.

A solenoid valve that automatically moves to an open position when power to a fuel processing assembly is interrupted.

A solenoid valve configured to move to a closed position when the solenoid valve receives a control signal.

A solenoid valve configured to automatically move to an open position when the solenoid valve does not receive a control signal.

A control system configured to send a control signal to a solenoid valve.

An enclosure containing at least a portion of a fuel processing assembly and at least a portion of a purge assembly.

An enclosure having an exhaust port.

A hydrogen-producing region contained within an enclosure.

A hydrogen-producing region configured to produce, via a steam reforming reaction, a reformate stream from at least one feed stream.

A purification region contained within an enclosure.

A purification region including a hydrogen-selective membrane.

A purification region configured to produce a permeate stream comprised of the portion of a reformate stream that passes through a hydrogen-selective membrane, and a byproduct stream comprised of the portion of the reformate stream that does not pass through the membrane.

A reformer sensor assembly configured to detect temperature within a hydrogen-producing region.

A reformer sensor assembly configured to detect temperature in the purification region.

A heating assembly configured to receive at least one air stream and at least one fuel stream.

A heating assembly configured to combust at least one fuel stream within a combustion region contained within an enclosure producing a heated exhaust stream for heating at least a hydrogen-producing region to at least a minimum hydrogen-producing temperature.

A damper moveably connected to an exhaust port.

A damper configured to move among a plurality of positions.

A damper configured to move among a fully open position in which the damper allows a heated exhaust stream to flow through an exhaust port, a closed position in which the damper prevents the heated exhaust stream from flowing through the exhaust port, and a plurality of intermediate open positions between the fully open and closed positions.

A damper controller configured to move a damper between fully open and closed positions based, at least in part, on a detected temperature in a hydrogen-producing region.

A damper controller configured to move a damper between fully open and closed positions based, at least in part, on a detected temperature in at least one of a hydrogen-producing region and a purification region.

A damper controller configured to move a damper toward a closed position when a detected temperature is above a predetermined maximum temperature.

A damper controller configured to move a damper toward an open position when a detected temperature is below a predetermined minimum temperature.

A buffer tank configured to contain a product hydrogen stream.

A product conduit fluidly connecting a fuel processing assembly and a buffer tank.

A tank sensor assembly configured to detect pressure in a buffer tank.

A product valve assembly configured to manage flow in a product conduit.

At least one valve that is configured to operate between a flow position in which a product hydrogen stream from a fuel processing assembly flows through a product conduit and into a buffer tank, and a vent position in which the product hydrogen stream from the fuel processing assembly is vented prior to the buffer tank.

A three-way solenoid valve.

A first valve configured to control flow of a product hydrogen stream between a fuel processing assembly and a buffer tank.

A first valve configured to move between a first open position in which a product hydrogen stream flows between a fuel processing assembly and a buffer tank, and a first closed position in which the product hydrogen stream does not flow between the fuel processing assembly and the buffer tank.

A second valve configured to vent a product hydrogen stream from a fuel processing assembly.

A second valve configured to move between a second open position in which a product hydrogen stream is vented, and a second closed position in which the product hydrogen stream is not vented.

A control assembly configured to operate a fuel processing assembly between run and standby modes based, at least in part, on detected pressure.

A control assembly configured to operate a fuel processing assembly in a standby mode when detected pressure in a buffer tank is above a predetermined maximum pressure.

A control assembly configured to operate a fuel processing assembly in a run mode when detected pressure in a buffer tank is below a predetermined minimum pressure.

A control assembly configured to direct a product valve assembly to vent a product hydrogen stream from a fuel processing assembly when the fuel processing assembly is in the standby mode.

A control assembly configured to move at least one valve to a flow position when a fuel processing assembly is in a run mode.

A control assembly configured to move at least one valve to a vent position when a fuel processing assembly is in a standby mode.

A control assembly configured to move a first valve to a first open position and a second valve to a second closed position when a fuel processing assembly is in a run mode.

A control assembly configured to move a first valve to a first closed position and a second valve to a second open position when a fuel processing assembly is in a standby mode.

INDUSTRIAL APPLICABILITY

The present disclosure, including hydrogen generation assemblies, hydrogen purification devices, and components of those assemblies and devices, is applicable to the fuel-processing and other industries in which hydrogen gas is purified, produced, and/or utilized.

The disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where any claim recites "a" or "a first" element or the equivalent thereof, such claim should be understood to include incorporation of one or more such elements, neither requiring nor excluding two or more such elements.

Inventions embodied in various combinations and subcombinations of features, functions, elements, and/or properties may be claimed through presentation of new claims in a related application. Such new claims, whether they are directed to a different invention or directed to the same invention, whether different, broader, narrower or equal in scope to the original claims, are also regarded as included within the subject matter of the inventions of the present disclosure.

What is claimed is:

1. A method of generating hydrogen in a hydrogen generation assembly, comprising:
    receiving a feed stream in a fuel processing assembly of the hydrogen generation assembly;
    generating a product hydrogen stream in the fuel processing assembly from the received feed stream, wherein generating the product hydrogen stream includes (a) generating an output stream in a hydrogen generating region of the fuel processing assembly from the received feed stream, and (b) generating the product hydrogen stream in a purification region of the fuel processing assembly from the output stream, the output stream contains hydrogen gas and the product hydrogen stream includes a hydrogen concentration greater than the output stream;
    receiving the generated product hydrogen stream in a buffer tank of the hydrogen generation assembly;
    detecting pressure in the buffer tank via a tank sensor assembly;
    stopping, via a control assembly, generation of the product hydrogen stream in the fuel processing assembly when the detected pressure in the buffer tank is above a predetermined maximum pressure, wherein stopping generation of the product hydrogen stream does not include powering down the fuel processing assembly and does not include loss of power to the fuel processing assembly; and
    controlling, via the control assembly, a product valve assembly to vent the product hydrogen stream from the fuel processing assembly when generation of the product hydrogen stream has stopped, wherein receiving the generated product hydrogen stream in a buffer tank includes controlling, via the control assembly, the product valve assembly so the product valve assembly does not vent the product hydrogen stream from the fuel processing assembly.

2. The method of claim 1, further comprising controlling, via the control assembly, the product valve assembly to isolate the buffer tank from the product hydrogen stream generated by the fuel processing assembly when generation of the product hydrogen stream has stopped.

3. The method of claim 2, further comprising opening, via the control assembly, a purge valve to allow a purge gas to flow through one or more portions of the fuel processing assembly based on detecting an interruption of power to the fuel processing assembly.

4. A method of generating hydrogen in a hydrogen generation assembly, the hydrogen generation assembly including:
    a fuel processing assembly configured to receive a feed stream and to be operable among a plurality of modes, including a run mode in which the fuel processing assembly generates a product hydrogen stream from the feed stream, and a standby mode in which the fuel processing assembly does not generate the product hydrogen stream from the feed stream, wherein the standby mode does not include when the fuel processing assembly is powered down and does not include loss of power to the fuel processing assembly, wherein the fuel processing assembly includes a hydrogen generating region and a purification region, the hydrogen generating region being configured to receive the feed stream and to generate an output stream containing hydrogen gas, the purification region being configured to receive the output stream and generate the product hydrogen stream, the product hydrogen stream having a hydrogen concentration greater than the output stream, a buffer tank configured to contain the product hydrogen stream, a product conduit fluidly connecting the fuel processing assembly and the buffer tank, a tank sensor assembly configured to detect pressure in the buffer tank, a control assembly configured to operate the fuel processing assembly between the run and standby modes based, at least in part, on the detected pressure in the buffer tank, and a product valve assembly configured to direct flow of the product hydrogen stream in the product conduit; the method comprising:

receiving the feed stream in the fuel processing assembly when the fuel processing assembly is in the run mode;

generating the product hydrogen stream in the fuel processing assembly from the received feed stream when the fuel processing assembly is in the run mode, wherein generating the product hydrogen stream includes (a) generating the output stream in the hydrogen generating region of the fuel processing assembly from the received feed stream, and (b) generating the product hydrogen stream in the purification region of the fuel processing assembly from the output stream;

controlling, via the control assembly, the product valve assembly so the product valve assembly does not vent the product hydrogen stream from the fuel processing assembly when the fuel processing assembly is in the run mode;

receiving the product hydrogen stream in the buffer tank;

detecting pressure in the buffer tank via the tank sensor assembly;

placing, via the control assembly, the fuel processing assembly in standby mode when the detected pressure in the buffer tank is above a predetermined maximum pressure; and controlling, via the control assembly, the product valve assembly to vent the product hydrogen stream from the fuel processing assembly when the fuel processing assembly is in the standby mode.

5. The method of claim 4, wherein venting the product hydrogen stream includes controlling, via the control assembly, the product valve assembly to isolate the buffer tank from the product hydrogen stream generated by the fuel processing assembly when the fuel processing assembly is in the standby mode.

6. The method of claim 5, where the fuel processing assembly further includes a purge assembly having a purge valve, wherein the method further comprises opening, via the control assembly, the purge valve to allow a purge gas to flow through one or more portions of the fuel processing assembly based on detecting an interruption of power to the fuel processing assembly.

\* \* \* \* \*